(12) United States Patent
Stafford et al.

(10) Patent No.: US 7,796,592 B2
(45) Date of Patent: Sep. 14, 2010

(54) OPTIMIZING STATIC DICTIONARY USAGE FOR SIGNAL, HYPERTEXT TRANSFER PROTOCOL AND BYTECODE COMPRESSION IN A WIRELESS NETWORK

(75) Inventors: Matthew Stafford, Austin, TX (US); Kennie Y. Kwong, Atlanta, GA (US); Mark S. Wuthnow, Austin, TX (US); William Rosenberg, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 403 days.

(21) Appl. No.: 11/772,460

(22) Filed: Jul. 2, 2007

(65) Prior Publication Data

US 2008/0112411 A1 May 15, 2008

Related U.S. Application Data

(63) Continuation-in-part of application No. 11/559,310, filed on Nov. 13, 2006.

(51) Int. Cl.
*H04L 12/50* (2006.01)
(52) U.S. Cl. ........................ 370/389; 370/477
(58) Field of Classification Search ............. 370/477; 707/1, 101
See application file for complete search history.

(56) References Cited

U.S. PATENT DOCUMENTS 6,078,951 A 6/2000 Pashupathy et al.

(Continued)

FOREIGN PATENT DOCUMENTS

WO WO02073810 A1 9/2002

(Continued)

OTHER PUBLICATIONS

Liu, Zhigang et al., "Scalable, Robust, Efficient Dictionary-Based Compression (SCRIBE) <draft-liu-rohc-scribe-01.txt>" Nokia Research Center, IETF Standard-Working-Draft, Internet Engineering Task Force, IETF, CH, No. 1, Jul. 18, 2001, pp. 1-86.

(Continued)

*Primary Examiner*—Thong H Vu
(74) *Attorney, Agent, or Firm*—Zagorin O'Brien Graham LLP

(57) ABSTRACT

Methods and apparatus including a virtual machine and a compression network platform are provided especially for improving the application of compression algorithms and unique identifiers for bytecode and bytecode packages including associated static dictionaries utilized to advantage in wireless networks. In particular, a given virtual machine need only identify to a receiving virtual machine the unique package identifier for one or more of an algorithm, a static dictionary or a hash for decompressing a received data signal. The receiving virtual machine may advertise what it has locally available to it so that no uploading is necessary. The actuation of bytecode by identifier may be requested at a given destination within the parameters set by RFC 3320. Universal decompressor virtual machines may receive uploaded compression algorithms, bytecode identifiers, package identifiers or static dictionary identifiers and the like from proxy call session control functions of a wireless network, the compressing machine or a compression network platform resource which in one embodiment may comprise an IANA database. The methods and apparatus may find particular application in improving the efficiency of presence/group list management.

18 Claims, 12 Drawing Sheets

U.S. PATENT DOCUMENTS

| | | | | |
|---|---|---|---|---|
| 6,163,780 | A * | 12/2000 | Ross | 707/101 |
| 6,968,185 | B2 | 11/2005 | Chitrapu et al. | |
| 7,024,187 | B2 * | 4/2006 | Moles et al. | 455/423 |
| 7,102,552 | B1 * | 9/2006 | Archbold et al. | 341/87 |
| 7,143,191 | B2 * | 11/2006 | Chuah et al. | 709/247 |
| 7,213,143 | B1 * | 5/2007 | Watson et | 713/151 |
| 7,348,904 | B2 * | 3/2008 | Christoffersson et al. | 341/106 |
| 7,412,541 | B1 * | 8/2008 | Stadler et al. | 709/247 |
| 7,554,467 | B2 * | 6/2009 | Thomas | 341/106 |
| 7,603,479 | B2 * | 10/2009 | Shand et al. | 709/238 |
| 2003/0097474 | A1 | 5/2003 | Defosse et al. | |
| 2004/0039926 | A1 * | 2/2004 | Lambert | 713/189 |
| 2004/0193920 | A1 * | 9/2004 | Kiss et al. | 713/201 |
| 2005/0004972 | A1 | 1/2005 | Meskauskas | |
| 2005/0234853 | A1 * | 10/2005 | Barth et al. | 707/1 |
| 2006/0262812 | A1 * | 11/2006 | Liu et al. | 370/477 |
| 2006/0270418 | A1 | 11/2006 | Hannu et al. | |
| 2007/0002855 | A1 | 1/2007 | Pessi | |
| 2007/0258451 | A1 * | 11/2007 | Bouat | 370/389 |
| 2008/0037509 | A1 | 2/2008 | Foti | |
| 2008/0115125 | A1 | 5/2008 | Stafford et al. | |

FOREIGN PATENT DOCUMENTS

| | | |
|---|---|---|
| WO | 2005011298 | 2/2005 |

OTHER PUBLICATIONS

Price, Richard et al.: "Universal Decompressor Virtual Machine (UDVM) <draft-ietf-rohc-sigcomp-udvm-00.txt>" IETF Standard-Working-Draft, Internet Engineering Task Force, IETF, CH, vol. rohc, Jan. 28, 2002, pp. 1-43.

Nordberg Mats, et al.: "Improving SigComp Performance Through Extended Operations," Vehicular Technology Conference, 2003, IEEE 58th Vehicular Technology Conference, Oct. 6-9, 2003, vol. 5, pp. 3425-3428.

Invitation to Pay Additional Fees and Partial International Search, European Patent Office, mailed Jul. 27, 2009 for PCT/US2007/082469, 6 pages.

Non-Final Office Action mailed Jul. 10, 2009 in U.S. Appl. No. 11/559,310, 15 pages.

B. Campbell, et al., "Instant Message Sessions in Simple," Simple Working Group, Cisco Systems, May 22, 2003, pp. 1-44.

C Jennings, et al., "Relay Extensions for Message Sessions Relay Protocol (MSRP)," Simple Working Group, Systems, Inc., Apr. 20, 2004, pp. 1-27.

L. Peter Deutsch, et al., "RFC1950 ZLIB Compressed Data Format Specification version 3.3," Network Working Group, Aladdin Enterprises, May 1996, pp. 1-11.

P. Deutsch, "RFC1951 Deflate Compressed Data Format Specification version 1.3," Network Working Group, Alladin Enterprises, May 1996, pp. 1-17.

P. Deutsch, "RFC1952 GZIP file format specification version 4.3," Network Working Group, Aladdin Enterprises, May 1996, pp. 1-12.

R. Price, et al., "RFC3320 Signaling Compression (SigComp)," Networking Working Group, Jan. 2003, pp. 1-62.

H. Hannu, et al., "RFC3321 Signaling Compression (SigComp)—Extended Operations," Network Working Group, Jan. 2003, pp. 1-18.

G. Camarillo, "RFC3486 Compressing the Session Initiation Protocol (SIP)," Network Working Group, Ericsson, Feb. 2003, 9 pages.

M. Garcia-Martin, et al., "RFC3485 The Session Initiation Protocol (SIP) and Session Description Protocol (SDP) Static Dictionary for Signaling Compression (SigComp)," Network Working Group, Feb. 2003, pp. 1-30.

Richard Price, et al., "Universal Decompressor Virtual Machine (UDVM)," Network Working Group, Jan. 28, 2002, pp. 1-43.

Garcia-Martin, M., "The Presence-Specific Dictionary for the Signaling Compression (Sigcomp) Framework," Simple Working Group Internet-Draft, URL <tools.ietf.org/html/draft-garcia-simple-presence-dictionary-00>, Jun. 16, 2006, pp. 1-16.

International Preliminary Report on Patentability with Written Opinion mailed Sept. 29, 2009 in International App. No. PCT/US2007/082469, 12 pages.

* cited by examiner

US 7,796,592 B2

OPTIMIZING STATIC DICTIONARY USAGE FOR SIGNAL, HYPERTEXT TRANSFER PROTOCOL AND BYTECODE COMPRESSION IN A WIRELESS NETWORK

This application is a continuation-in-part of U.S. patent application Ser. No. 11/559,310, filed Nov. 13, 2006 by the same inventors entitled, "Optimizing Static Dictionary Usage for Signal Compression and Hypertext Transfer Protocol Compression in a Wireless Network, incorporated herein by reference in its entirety.

TECHNICAL FIELD

The technical field relates to wireless communication networks and, in particular, to methods and apparatus for facilitating and optimizing the application of compression, for example, to signal transmission generally and, for example, to hypertext transfer protocol and bytecode uploading and/or bytecode actuation along with associated static dictionaries in such networks.

BACKGROUND OF THE EMBODIMENTS

Generally, wireless communication networks suffer a disadvantage in comparison with wired communication networks because wireless communication networks must utilize valuable radio frequency spectrum for the transmission of signals to wireless mobile devices (including portable terminals such as computer terminals or personal communication devices). Licensed spectrum is expensive to purchase as exemplified by the wireless communications RF spectrum sales of the 1990's. Moreover, the greater the application of uncompressed signals, power for transmitting signals in the purchased RF spectrum can be wasted along with the spectrum utilization increase. Further complicating and making the need for compression even greater in a wireless communication network, the applications for such mobile devices have greatly expanded as wireless communications have, in many instances, replaced wired communication devices because of the great, almost unbounded popularity of the devices and the features that such devices may provide.

Consider, for example, currently available mobile devices providing input/output for taking and receiving digital photographs (which can be compressed in accordance with known JPEG compression techniques), receiving downloaded MPEG compressed movie streams for a subscriber's viewing pleasure, the opportunity to short text message to "buddy lists" of friends, associates and family members having mobile devices, download, store and play compressed digital music in stereo of the subscriber's choice and so on.

Also consider the differences between text compression, for example, the compression of a voice message converted to text or a text document or a text message versus JPEG or MPEG compression. The former needs to be lossless, that is, the message at the transmitter ideally should be perfectly reproduced at the receiver after compression and decompression. On the other hand, JPEG and MPEG image compression follow a different philosophy. The compression/decompression process does not need to be perfect. Some original image data may be intentionally lost but only such that the received image is practically identical to the transmitted image and any loss is not perceptible to the viewer.

In a virtual machine, bytecodes are known for representing the machine language of, for example, a Java virtual machine. The bytecode stream represents a sequence of instructions for the virtual machine. Besides bytecode compression, the hypertext transfer protocol (HTTP) is a candidate for compression. HTTP is a known protocol for internet address and command processing. In wireless communications involving the network, there is a need for compression of such data signals. These types of data streams are akin to text compression where there is a requirement for lossless compression/decompression processes.

Many of the new applications for mobile devices have centered around an implementation of a session initiation protocol (SIP) described, for example, by RFC 3261. SIP provides a protocol for negotiating session parameters between session endpoints, for example, such as setting up and tearing down Voice over IP sessions between VoIP phones or sessions in which a camera image is transmitted from one cell phone to another. Moreover, data signal transmission and data compression are also known from such well known compression algorithms as ZLIB (RFC 1950), DEFLATE (RFC 1951) and GZIP (RFC 1952), and other compression algorithms and techniques, all of which are well known to the Internet community at large.

More recently, progress has been made in the development of standard compression interfaces and techniques for signal compression as exemplified by the efforts described by RFC 3320 and RFC 3321. Also, recently, a session initiation protocol (SIP) and a session description protocol (SDP) static dictionary has been described in RFC 3485. Moreover, a so-called universal decompressor virtual machine (UDVM) is described, for example, in RFC 3320, much like a Java virtual machine, for running decompression algorithms and to provide almost unlimited flexibility for choosing how to compress/decompress a given item of data. With UDVM, both terminal ends, referred to as endpoints, for example, two mobile devices exchanging photographs or a mobile device gaining access to a video-on-demand movie server, must execute a decompression bytecode that is compatible with the compression algorithm employed at the other end for the data signal; otherwise, decompression will fail to reproduce the original signal. Moreover, successful use of a given bytecode may require that one or more static dictionaries be available to the UDVM that executes the bytecode. Bytecode is defined in RFC 3320 as machine code that can be executed by a virtual machine such as a UDVM. An endpoint is defined as one instance of an application, a SigComp layer, and a transport layer for sending and receiving SigComp messages.

An example of an endpoint according to RFC 3320 is shown in FIG. 1 taken from RFC 3320 but further including UDVM memory 131. An endpoint as defined above may include a compressor dispatcher 110 and a decompressor dispatcher 115, a UDVM decompressor 130 and an associated memory 131, a state handler 135 and compressors 1 120 and 2 125 operating between an application layer 105 and a transport layer 140. Bytecode for running UDVM 130 is typically stored in memory 131 comprising UDVM registers (not shown). A UDVM memory may be a maximum 65536 bytes.

Section 7 of RFC 3320 defines a SigComp message format, for example, as per FIG. 2 and is taken from FIG. 3 of RFC 3320 but is modified according to one embodiment of one inventive aspect for permitting an efficient loading of bytecode. Section 7.3 particularly describes a process of uploading UDVM bytecode to the UDVM 130 of an endpoint of FIG. 1. Moreover, RFC 3320 suggests where bytecode should be installed in UDVM memory 131. However, the bytecode is presently limited to a maximum size of 4095 bytes.

A typical UDVM instruction set comprises 36 instructions, of which certain instructions have associated operands. To reduce the size of typical UDVM bytecode, RFC 3320 suggests that operands for a UDVM instruction be compressed using variable-length encoding, the aim being to store more common operand values using fewer bytes than more rarely occurring values. Also, RFC 3320, section 3.3.3 suggests that an endpoint may offer "well-known decompression algorithms, dictionaries of common phrases used in a specific signaling protocol" and the like.

A state is defined by RFC 3320 as data saved for retrieval by later SigComp messages. If a given state item is already locally available at a decompressing UDVM 130 of the endpoint of FIG. 1, it need not be uploaded to the endpoint. While RFC 3320 suggests that well known decompression algorithms can be utilized at endpoints per FIG. 1 as locally available state items, RFC 3320 fails to specify where in UDVM memory locally available bytecode as a state item should be placed. Although RFC 3320 states that endpoints "can indicate their interest in receiving a list" of state items that are locally available at the far end, RFC 3320 does not specify actions to take upon learning that a desired state item is not available. In particular, RFC 3320 does not offer a means for an endpoint to update its collection of bytecodes and/or static dictionaries for the benefit of subsequent Sig-Comp usage.

On the other hand, in SigComp as applied in SIP, headers as well as message bodies may be compressed. Yet, network elements need to read the SIP headers for routing and other purposes. Consequently, there is a problem with end-to-end transmission for SIP because a network element may have to decompress headers along a route to an end point. Consequently, there may be a problem with the applicability of SigComp end-to-end as would be required as applied in SIP.

Also, in accordance with the third generation partnership project, 3G PP, for the global system for mobile communications (GSM) and which can be used in related UMTS standards, an internet protocol (IP) multimedia subsystem (IMS) has been defined for multimedia applications, for example, per TS 23.228, 24.228 and related technical specifications. There is proposed, for example, a proxy call session control function (P-CSCF), an interrogating CSCF (I-CSCF) and a serving CSCF (S-CSCF). SIP messages between one's handset and its associated P-CSCF may be compressed as are SIP messages between another person's handset and its P-CSCF. But between P-CSCF's, the SIP messages are generally uncompressed because as explained above the headers are needed for routing, and there is limited motivation to apply SigComp to a portion of a message and not the whole. These control functions are known for use in home and visited networks by mobile devices for multimedia services as an outbound proxy (the first SIP-layer point of contact for a mobile device in, for example, a general packet radio service (GPRS) network). These control functions may be accessed by a mobile device that would want to engage in a real-time interactive multimedia application with a mobile device in the same or in another wireless communication network.

The virtual machines such as the UDVM 130 of FIG. 1 are resident in, for example, a mobile device and, for example, a proxy call session control function (P-CSCF) endpoint or any other endpoint. Again, the capabilities of both ends of a communication path should be consistent with one another to successfully restore compressed content to its original form.

Presence is becoming increasingly important to wireless network features and services. Presence relates to registration of a mobile device that is turned on and in a mode for receiving communications which may be standard voice calls or limited to receiving, for example, text messages from a "buddy." As alluded to above, one or more "buddy lists" may be input by a wireless subscriber for friends, associates and family of the subscriber and used to signal "presence" information among "buddies." The wireless subscriber will typically wish to receive updates regarding his/her buddies' presence status, as presence status is dynamic. For example, a college student may receive presence information indicating that a given buddy is currently not available for voice calls but can receive text messages. Based on this information, the student signals that "buddy" by text message to meet him/her in the library at 10:00 AM. In so doing, eXtensible Markup Language (XML) (not visible to the user) is commonly used to represent contact information, such as an address book, each of which may be delimited with the string <contact> at the beginning of the string of contacts and </contact> at the end of the string. Inside one of the contact strings, <name> and </name> may be used to identify a name of a "buddy" or contact. Presence information, bracketed by additional delimiters, may be stored with the contact information. SIP has been identified as a suitable vehicle for publishing one's presence information and for receiving updates regarding a buddy's presence. HTTP has been identified as a suitable vehicle for managing one's buddy lists. So for presence and buddy list management, SIP and HTTP messages are launched and the message bodies may be XML documents. Consequently, there remains an opportunity to apply compression in such an application.

Referring to alternative embodiments, FIG. 2 and FIG. 2A, there is shown the format of a SigComp message which is taken from RFC 3320 FIG. 3 but modified according to an inventive aspect. A SigComp message with a "length" field equal to 00 contains an uploaded UDVM bytecode for use by the decompressing endpoint of FIG. 1. In this case, the first 12 bits after the returned feedback item indicate the length of the uploaded bytecode. Referring again to FIG. 2 or FIG. 2A, these 12 bits comprise a bytecode code_len field. RFC 3320 does not explicitly prohibit a code_len of all zeroes. However, such a code_len would not make sense in the context of loading a non-trivial bytecode. The fields remaining, except for "remaining SigComp message" are referred to in RFC 3320 as a SigComp header which may include uploaded UDVM bytecode (not shown in FIG. 2). The four bit "destination" field of FIG. 2 or 2A indicates where the uploaded bytecode may be placed.

Consequently, even with all these improvements in the art of providing compression techniques and virtual and other machines for providing compression/decompression at endpoints in accordance with alleged unlimited flexibility, there remains an opportunity to facilitate, if not to optimize, the use of compression via application, for example, of static dictionaries and other techniques for compressing various signals, bytecode, SIP and HTTP messages, XML document and other data signals used in a wireless communications network environment where the need for compression is the greatest.

SUMMARY OF THE INVENTION

Several embodiments will now be briefly described for facilitating compression/decompression of various data utilized in a wireless telecommunications network. According to one embodiment, a universal compression network platform (CNP) or related platform is provided as a wireless network resource for compression and decompression which an endpoint compressor, a decompressor UDVM or other virtual machine may use as a resource for assuring that a given bytecode, related static dictionary or compression or decompression algorithm are current. In its database or related server database may be maintained the latest version of a bytecode, a compression and associated decompression algorithm and/or related static dictionary or other compression/decompression tool such as a hash for universal access in a manner similar to the manner in which regional databases and servers have been provided for number portability in the United States. Alternatively, a compression network platform (CNP) may be implemented on a wireless communications network basis, for example, by each public land mobile network (PLMN) internationally or preferably on a more global basis. In a network by network implementation, each wireless network may agree to exchange and maintain their CNP databases by mutual agreement with the latest revisions and techniques. In this network by network embodiment of a CNP, there may be a problem with roaming among networks and whether the visited network needs to decompress SIP messages or in stead just forward them to a home network via GPRS roaming. On a more global basis, as was utilized in number portability, a global CNP may be accessed by all networks. All such CNP's are preferably provided with redundancy and in different regions of a country for purposes, for example, of disaster recovery. A UDVM at each endpoint of a communication channel may have on hand the bytecode and related dictionary or dictionaries that each needs by conducting a dialog between them, and, in the event of a difference resolve their difference between them or utilize a CNP or other server.

Rather than uploading or downloading bytecodes to a virtual machine, for example, associated with a mobile device or a P-CSCF, concise bytecode identifiers may be uploaded or downloaded in stead which uniquely identify the bytecode, for example, a compression algorithm or decompression algorithm. The unique identifier may comprise a hash of the bytecode, for example, in a manner similar to that described as a static dictionary in RFC 3485 for SIP and SDP or signal compression generally as described by RFC 3320 and 3321. In accordance with another embodiment, the unique identifier may include or comprise a universal resource name. According to one aspect of this embodiment, there may be a publicly-available registry for storing bytecodes so that they may be accessed by their universal resource name (as, for example, items stored in the Internet assigned numbers authority (IANA) database registry may be uniquely referenced by a querying entity). According to another aspect, the bytecode may be stored alongside its unique identifier (be it a hash, a universal resource name as suggested above or another type of unique identifier) in a named CNP as described above for universal access by any virtual machine, endpoint or other entity.

In the embodiments and aspects thereof described in the immediately preceding paragraph, it is also possible according to another aspect to identify a static dictionary with a unique identifier as discussed above. It is also possible that a hash of a bytecode or static dictionary may serve as a unique identifier of bytecode, a static dictionary or compression or decompression algorithm. Moreover, it is useful to incorporate into any such unique identifier an indication of the version number or name so that a comparison may demonstrate whether a given entity is less up-to-date or a given item may not be compatible with a given item stored at a resource. In one embodiment, a compression application of the bytecode or static dictionary may be applied, for example, to compress the bytecode for uploading/downloading. The compressed version may comprise a unique identifier. Consequently, a current method of transmitting uncompressed bytecode to a far end virtual machine may be replaced by sending one of a unique identifier, a compressed version or both.

According to one embodiment, there is provided a means for receiving bytecodes and retaining them for long-term utilization by a virtual machine. If a UDVM, for example, does not have a copy of a bytecode it needs for receiving a given compressed data signal transmission, the UDVM receiving the bytecode may first request the bytecode decompression method from the transmitting compression virtual machine. If it cannot receive the method from the transmitter machine, according to another aspect, it may receive a unique identifier for the decompression method and refer to universal resource name, an IANA registry or a CNP registry as suggested above according to the first and second alternative embodiments and receive the method from them along with its unique identifier including a version number. According to another related aspect, a new bytecode, unique identifier and its version may be propagated generally to virtual machines for long term storage therewith and subsequently referred to by its unique identifier at a compression/decompression virtual machine, for example, by a CNP or via IANA or other registry.

Moreover, locally available state items comprising bytecode or bytecode packaged with a static dictionary or dictionaries may be identified and actuated rather than uploaded. In particular, for example, and in compliance with RFC 3320, an all zeros value of the code_len field of FIG. 2 may signal that the next sequence of bits, for example, 20 bits, may represent an identifier for the uploaded bytecode which may determine the bytecode in a manner similar to that suggested by RFC 3320 for calculating a state identifier as per RFC 3320 section 3.3.3 and section 7.2. Further according to this embodiment a state_address referenced in RFC 3320 may comprise a bytecode in stead of a state and thus the bytecode determined and stored at the indicated destination of FIG. 2. In other words, rather than uploading bytecode at all, locally available state items, for example, bytecode, may be explicitly identified as such in a SigComp message according to FIG. 2.

In an alternative embodiment according to FIG. 2A, there may, for example, be a length indicator of 2 bits indicating, for example, one of four choices, for example, among 6, 9 or 12 bit bytecode partial state identifiers. With the four choices provided by two bits, there may follow simply a six bit bytecode partial state identifier, a nine bit bytecode partial state identifier or a twelve bit bytecode partial state identifier indicated, for example, by 01, 10 or 11 respectively. In the instance of utilizing less than eighteen remaining bits, the remainder may be utilized for remaining SigComp message. A choice of 00 remains. Such a signal may indicate, for example, a sequence of two nine bit bytecode partial state identifiers for, for example, a bytecode package comprising bytecode and an associated static dictionary. In a further alternative embodiment according to FIG. 2A, the two bit length identifier may be accompanied with or combined as a three bit identifier for eight choices which may include combinations of bytecode partial state identifiers such as two six bit identifiers or a nine bit identifier followed by a six bit identifier or a six bit followed by a nine bit identifier. The rest of the message may be reserved for remaining SigComp message. In an alternative, the bytecode partial state identifier length field of two or three bits may include a designation indicator for selection among bytecode/dictionary or two static dictionaries. This length indicator of this embodiment of FIG. 2A is then followed by the partial state identifier or identifier combinations in the remaining bits of the state identifier field of FIG. 2. Of course, other embodiments may come to mind of one of ordinary skill in the art, but any such embodiment related to FIG. 2 or 2A would require standardization so that both endpoints understand the SigComp message transmission.

In accordance with yet another embodiment, there is provided method and apparatus for advertising a locally available bytecode (possibly packaged with a dictionary or other state item) by an endpoint. For example, a user equipment (UE) end point may advertise specific local bytecode availability for use by its UDVM. Another endpoint, such as a P-CSCF, may recognize that it may utilize the embodiments of FIG. 2 or 2a for loading the advertised bytecode into bytecode memory at a given location. If the UE fails to advertise what bytecode is available, the P-CSCF may send a SigComp message uploading bytecode in the manner described by RFC 3320 and issuing an authentication challenge indicating that the P-CSCF has a second bytecode that the UE's UDVM may use and requests the UE to send a second register request to the authentication challenge.

In accordance with yet another embodiment, there is provided apparatus and a generalized method for obtaining new or updated state items as defined by RFC 3320. Besides bytecode per the illustrative embodiments described above, state items such as static dictionaries may be obtained and located in UDVM memory. For example, a bytecode package may be packaged with one or more static dictionaries the bytecode requires. A SIP INFO message may define a package, list its components and provide pointers to an HTTP server where the package components may be obtained, for example, in a manner similar to that described in RFC 4483.

In accordance with yet another embodiment, consider hypertext transfer protocol (HTTP) having a header and a message payload. An example of XML content is contact information such as an address book in XML in which each contact is delimited by the string <contact> contact data </contact>. Inside the XML contact, there may be <name> Ronald Reagan </name> and email addresses and telephone numbers, home addresses and the like for Ronald, each delimited by its own tag. In this embodiment, a static dictionary may be provided for compression of the HTTP payload or message portion. In particular, this embodiment recognizes common phrases used in the message portion such as tags from application-specific XML schema. Known compression algorithms for HTTP such as DEFLATE and GZIP may be augmented in this embodiment to provide a static dictionary for such common phrases which may be stored at the compressor and decompressor virtual machine and accessed as above from a CNP or via IANA or other registry. Consequently, consider the example of presence/group list management. Presence covers such concepts as online/offline status, preferred means of communication (for example, voice, video or text messaging and the like). Group list management includes the afore-mentioned contact or "buddy" lists. For example, a user wants to maintain one or more contact lists. For example, a subscriber's contacts may be grouped into separate lists (e.g. for colleagues and friends, or according to a variety of shared interests. So there is a need to manage a contact list or preferred sub-list of contacts who one contacts more or less frequently. The virtual machine contained within the mobile device or its server will have access to and permanently store the known compression/decompression algorithm along with its added feature of accessing a static dictionary for translating the common phrases into transmittable address data (in shorter form than the common phrase data) that may be used at the decompression end to address a look-up table of the static dictionary for decompression of the common phrase.

These and other aspects and embodiments will become clear from referring to the drawings and the detailed description of the embodiments which follow.

DETAILED DESCRIPTION OF THE EMBODIMENTS

Figure 1:
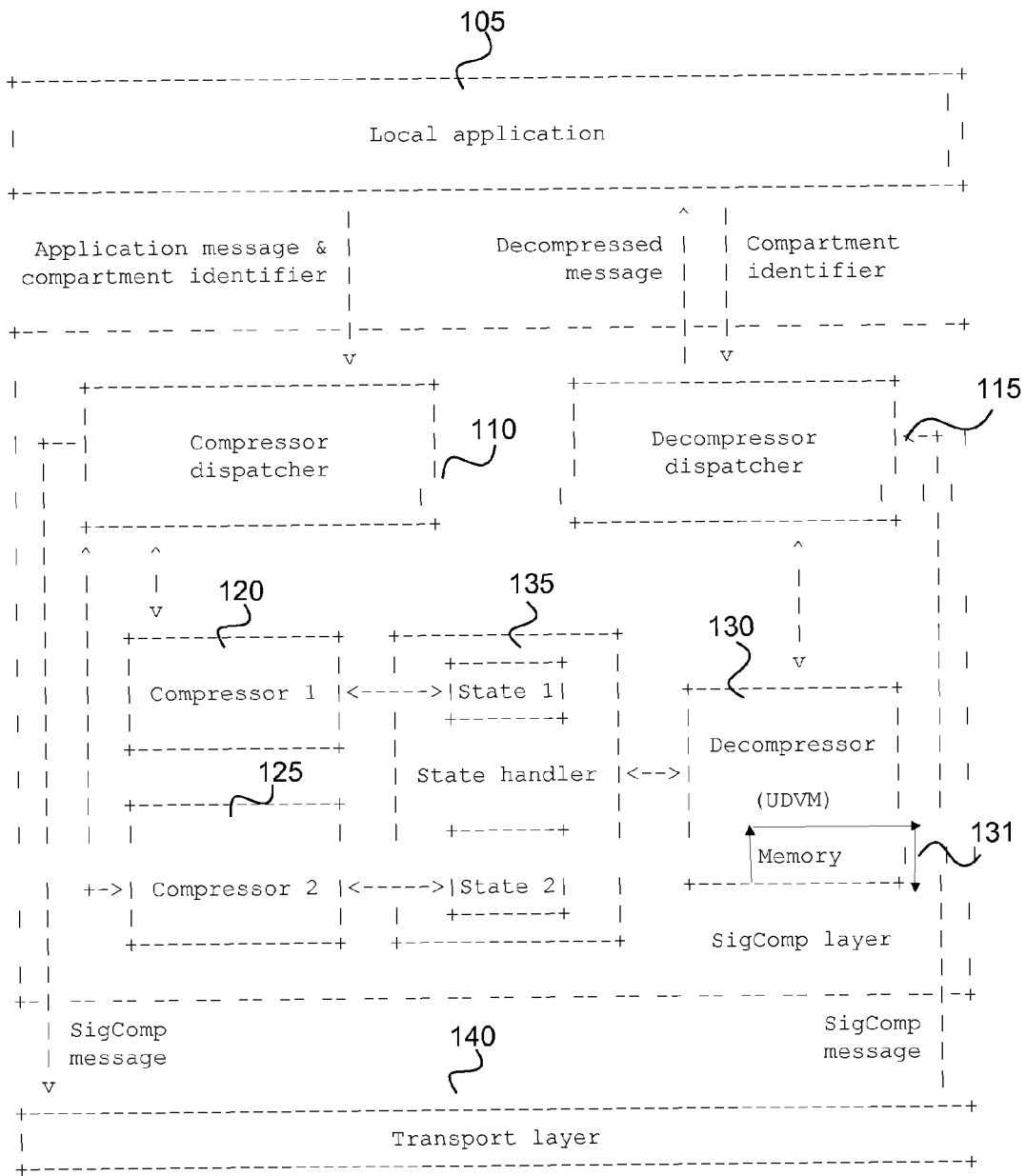
FIG. 1, taken from RFC 3320 for the most part, shows a typical endpoint which may comprise user equipment or a P-CSCF or other endpoint having compressors and a decompressor UDVM.

Referring first to FIG. 1, and according to one embodiment, taken from RFC 3320 for the most part, there is shown a typical endpoint which may comprise user equipment (UE) such as a mobile or fixed device or a P-CSCF or other endpoint of a wireless network having a decompressor UDVM 130 and associated memory 131. An endpoint as defined above and shown in FIG. 1 may include a compressor dispatcher 110 and a decompressor dispatcher 115, a UDVM decompressor 130 and an associated memory 131, a state handler 135 and compressor 1 120 and compressor 2 125. These operate between an application layer 105 and a transport layer 140. Bytecode for running UDVM 130 is typically stored in memory 131 comprising UDVM registers (not shown). A UDVM memory may be a maximum 65536 bytes as presently understood according to RFC 3320.

As more fully described by RFC 3320, incorporated herein by reference in its entirety, an application layer 105 may provide an application message and compartment identifier to a compressor dispatcher 110 for forming a compressed message as controlled by a state handler 135 coupled to decompressor UDVM 130 and memory. The SigComp message is output from the compressor dispatcher 110 toward the network of, for example, FIG. 7 via transport layer 140. Compressor dispatcher 110, decompressor dispatcher 115, compressor 1 and 2 110, 115, state handler 135 and decompressor UDVM 130 and memory 131 define a SigComp layer.

On the receive side, a SigComp message is received at the transport layer 140 and proceeds to decompressor dispatcher 115. The decompressor UDVM 115 must know what compression algorithm was used to compress and operates to decompress the received message according to received parameters and well known standards. Meanwhile, the application 105 operates to provide a compartment identifier and to receive the decompressed message from the decompressor dispatcher 115.

Figure 6:
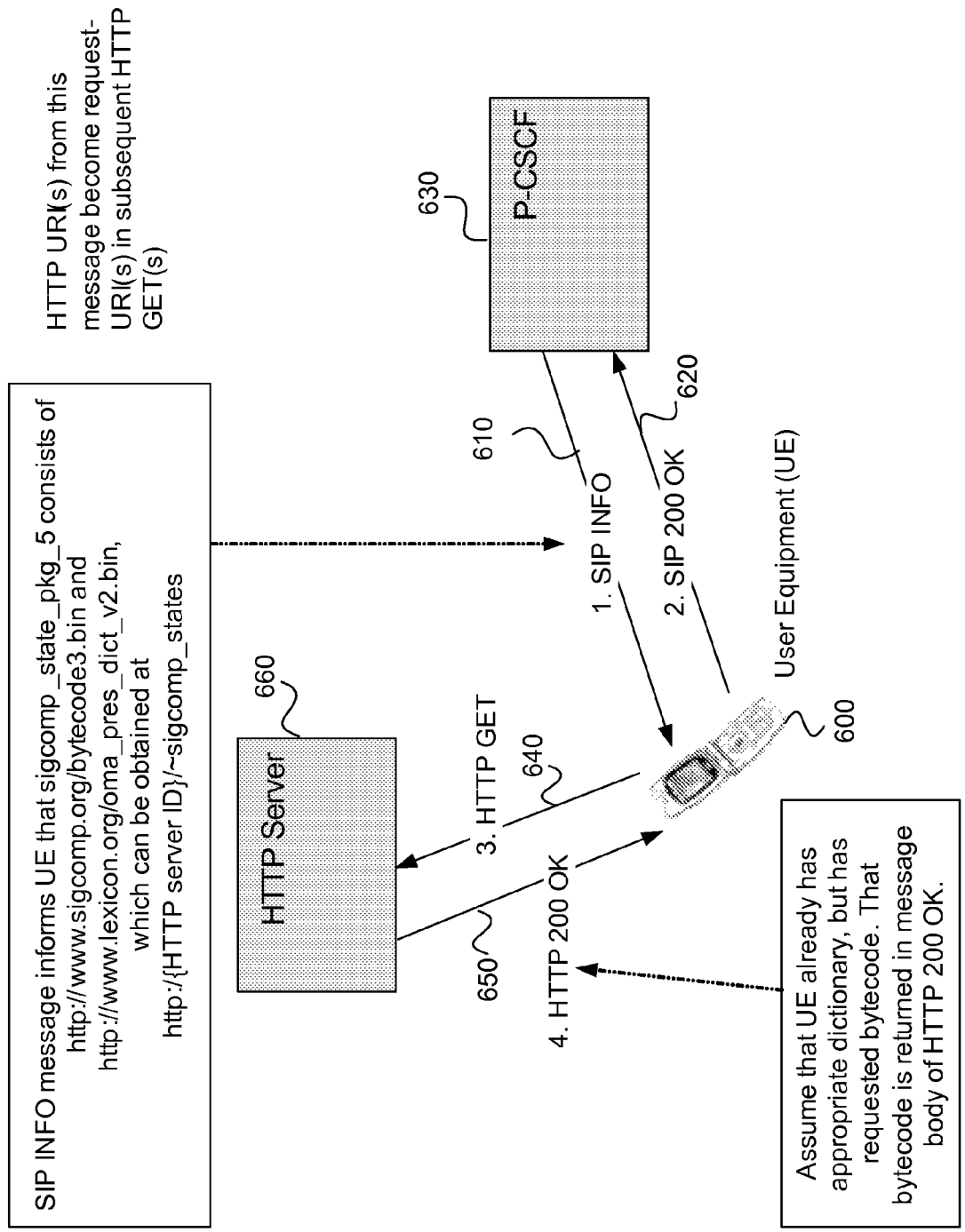
FIG. 6 provides an overview of a process or generalized method whereby an endpoint may obtain new or updated state items including bytecode and associated static dictionaries from an HTTP server or, more generally, a compression network platform of FIG. 7.
Figure 7:
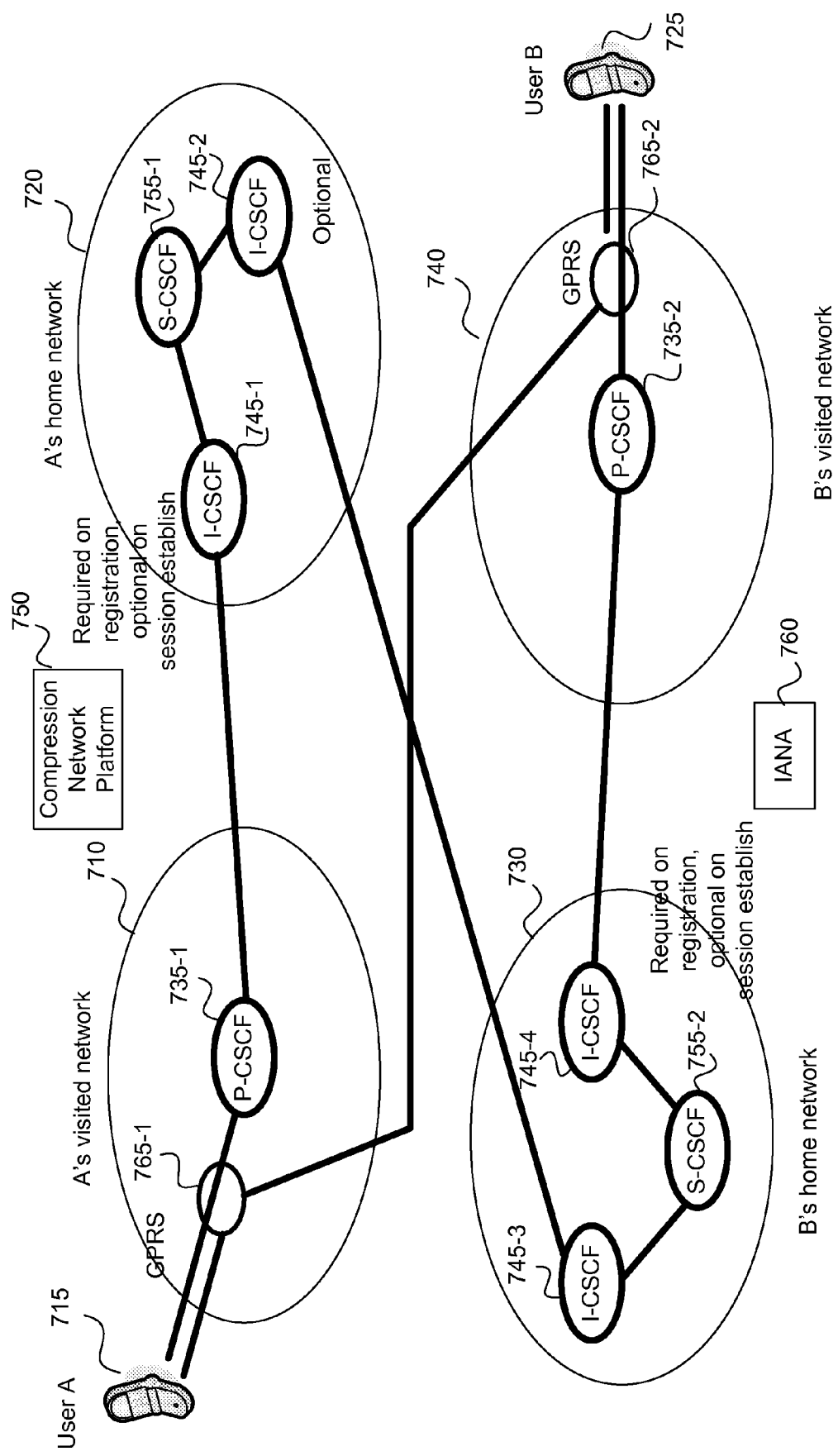
FIG. 7 shows an overview of a network connection between endpoints for understanding the context of FIGS. 1-6 and 8-11, whereby, an endpoint, for example, a first mobile device or user equipment visits a visited wireless network and a second mobile device or user equipment in a different visited wireless network with their home networks also shown as a scenario, for example, of sending a photograph captured by the first mobile device to the second mobile device, also showing a compression network platform and IANA among other possible network resources of embodiments for any virtual or other machine of an endpoint according to FIG. 1 for compressing/decompressing data signals.

Referring briefly to FIG. 7, many endpoints exemplified by FIG. 1 may be involved in a typical call between User A 715 and User B 725 including, but not limited to, user equipment (UE), interrogating call session control functions (I-CSCF), proxy call session control functions (P-CSCF) and serving call session control functions (S-CSCF), two of which will be discussed in this detailed description (UE and a P-CSCF) along with an HTTP or dictionary server per FIG. 6, 10 or 11 or related server such as a compression network platform 750 or IANA server 760 shown in FIG. 7. Any one of these may be an endpoint per FIG. 1 and utilize aspects and embodiments as described below.

The UDVM virtual machine 130 of one such endpoint, such as user equipment (UE) or a P-CSCF, comprises an element which must be able to communicate with a second endpoint. According to RFC 3320, incorporated herein by reference in its entirety, and, as dated January of 2003, there is provided a SigComp message and a method of uploading bytecode per section 7.3 thereof. The methods discussed in RFC 3320 comply with two possible formats of the SigComp message format of FIG. 3 thereof. However, according to one inventive aspect, there is a code_len value that has a value that may be all zeroes and thus may signal that subsequent data may represent alternative data to that depicted in FIG. 3 of RFC 3320. Alternative embodiments of signal formats for signaling an endpoint will now be discussed with reference to FIGS. 2 and 2A.

Figure 2:
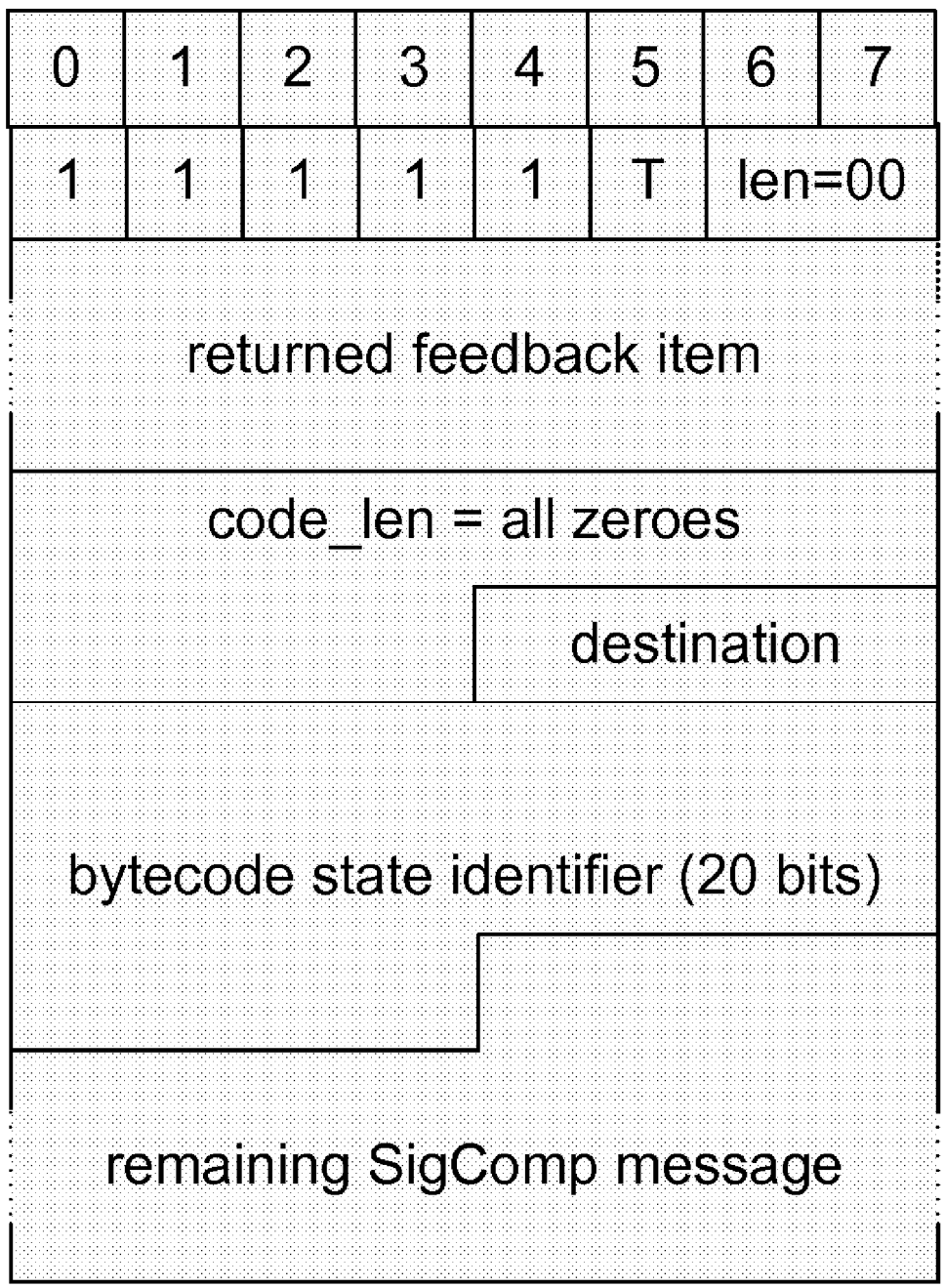
FIG. 2 provides an exemplary format for a SigComp message similar to that provided by FIG. 3 of RFC 3320 showing, for example, use of a code_len value field of all zeroes to indicate that the following data comprises a destination and a bytecode state identifier.
Figure 3:
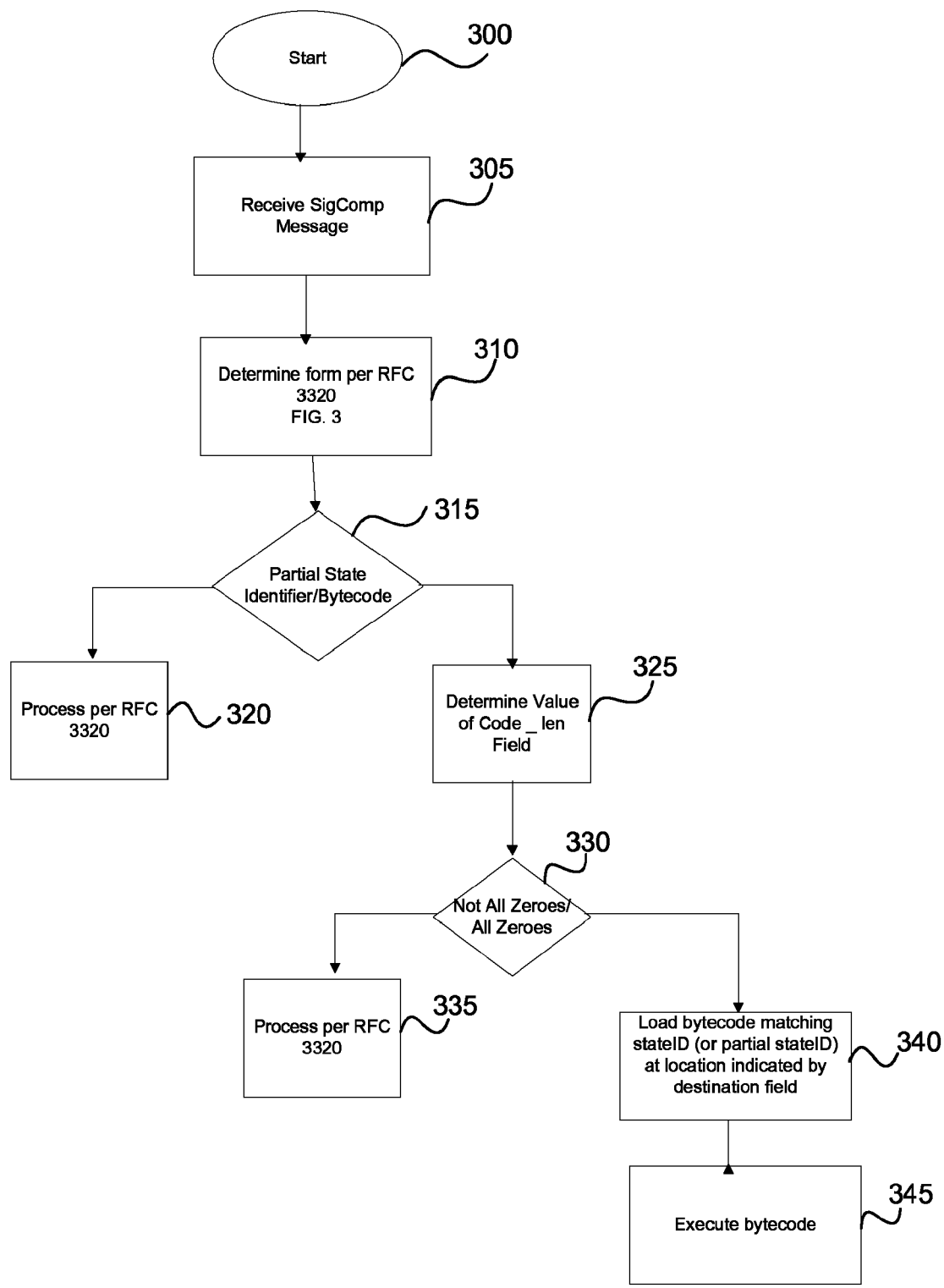
FIG. 3 provides a flowchart showing a method for actuating a locally available bytecode resident at an endpoint using the SigComp message of one of FIG. 2 or FIG. 2a or alternative message formats.

In particular, and referring to FIG. 2 of the present application, there is shown a variant of FIG. 3 of RFC 3320 in which the data following a 12 bit code_len value of all zeroes may comprise a destination of four bits and a bytecode state identifier that may comprise 20 bits prior to a remaining SigComp message portion according to FIG. 3 of RFC 3320. In this manner, a locally available state item such as bytecode (or a bytecode package to be defined subsequently herein) may be identified, calculated according to RFC 3320 and stored at the destination address specified by the SigComp message of FIG. 2. Consequently, an advantage of embodiments and aspects taught herein, the 4095 byte limitation on bytecode may be exceeded. In particular, the destination field in FIG. 2 indicates where the bytecode (or bytecode package), calculated according to a similar process as is used for calculating a state identifier, is placed in UDVM memory 131 of FIG. 1. Importantly, the bytecode may be identified to exceed the 4095 byte limitation and/or, as will be further described herein, may comprises a bytecode package uniquely identifying bytecode and an associated static dictionary of different byte lengths.

Thus, while RFC 3320 defines certain fields, for example, a state_address field for locally available state items, the inventive aspect discussed above per SigComp message format FIG. 2 clearly indicates that a given locally available state is in fact a bytecode (for example, as opposed to a static dictionary) or bytecode package, optionally including a static dictionary and also specifies where the bytecode or bytecode package should be loaded in memory 131. In this embodiment, the 20 bit bytecode state identifier comprises a single identifier for uniquely identifying one of a bytecode or a bytecode package comprising bytecode and an associated static dictionary.

Figure 2A:
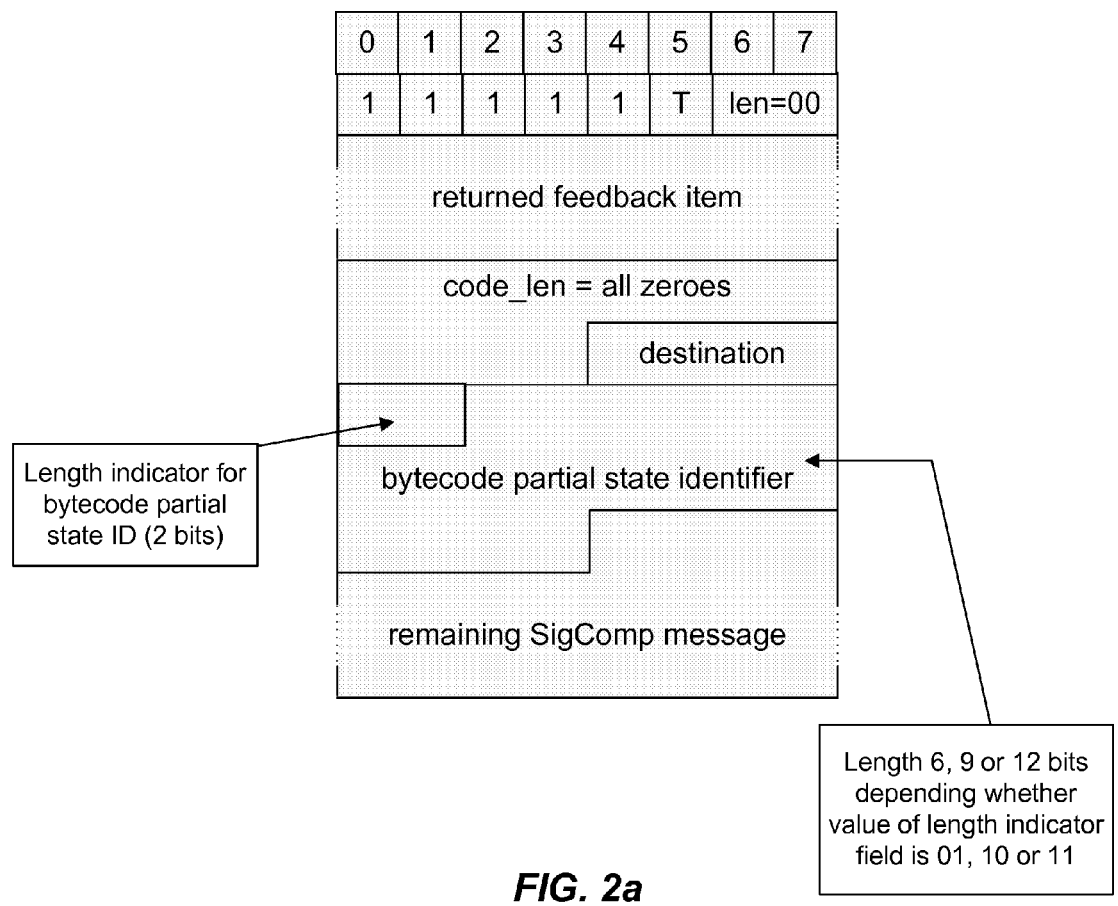
FIG. 2A provides a similar exemplary format further including a bytecode partial state identifier length indicator of, for example, two bits in length following the destination field that may define one (or more) six, nine or twelve bit bytecode partial state identifiers preceding a remaining SigComp message.

Referring now to FIG. 2a, there is shown a similar exemplary format further including a bytecode partial state identifier length indicator of, for example, two bits in length following the destination field that may define one (or more) six, nine or twelve bit bytecode partial state identifiers preceding a remaining SigComp message. A length indicator of 2 bits may follow the destination field in this alternative embodiment. The length indicator may indicate by its value a choice among 6, 9 or 12 bit bytecode partial state identifiers. For example, as shown in FIG. 2a, 01 may indicate a 6 bit identifier, 10 may indicate a 9 bit identifier and 11 may indicate a following 12 bit bytecode partial state identifier. With the four choices provided by two bits, there remains a possibility of utilizing the 00 indicator as an indicator, for example, of two nine bit bytecode partial state identifiers, one for bytecode and the second for a static dictionary. A three bit length indicator may indicate eight choices. Consequently, with eight choices there may be signaled two six bit bytecode partial state identifiers, a nine bit identifier and a six bit identifier or the reverse order of a six bit followed by a nine bit identifier. If the length indicator field were limited to a single bit, the single bit could still signal one of two choices among, for example, a nine bit bytecode partial state identifier and a twelve bit bytecode partial state identifier. The rest of the message "remaining SigComp message" may begin at the end of the transmission of data indicated by the length indicator for the bytecode partial state identifier. The bytecode partial state identifier may uniquely identify a bytecode or bytecode package as above and may be processed as described by RFC 3320 for a state identifier.

In an alternative, the bytecode partial state identifier length field of two bits again provides four choices and may be an indicator of combinations that must be predetermined and recognizable by both endpoints. Eighteen bits of a 20 bit standard field remain and can represent as many as three six bit partial state identifiers, two nine bit identifiers, one twelve and one six bit identifier or one nine bit and one six bit identifier or the reverse sequence of six bit followed by nine bit identifier. The length indicator field of the embodiment of FIG. 2A most conveniently follows the destination to comply with RFC 3320 but may appear elsewhere according to a revised standard. A length indicator as used here and in the claims may identify not only the length but the composition of the data to follow comprising partial state identifiers of different types and lengths if supported by a standard. The length indicator as thus defined may have predetermined length of 1, 2, 3 or more bits and may be followed by one or more partial state identifier or identifier combinations in remaining bits of a bytecode field. Of course, other embodiments may come to mind, for example, a four bit length indicator rather than two bits or comprise two different fields—one for length and one for designation a kind such as a bit to signal bytecode versus static dictionary or other type of state item. Any such embodiment related to FIG. 2A would require standardization so that both endpoints understand the SigComp message transmission.

Referring now to FIGS. 1-3, a machine implemented method of identifying locally resident bytecode (or a bytecode package) by a requesting endpoint in a message to another endpoint and causing the locally resident bytecode to be located at a destination at the other endpoint will now be described with particular reference to FIG. 3. A first endpoint, for example, a P-CSCF transmits a Sigcomp message per FIG. 2 to an endpoint which may, for example, comprise user equipment UE. UE runs an algorithm for identifying Sig-Comp messages which is modified according to FIG. 3. Step 300 represents the start of running a SigComp message recognition algorithm at an endpoint of FIG. 1. At step 305, in this example, the UE receives the SigComp message from P-CSCF at its UDVM 130 per FIG. 1. Per RFC 3320 FIG. 3, there are two formats in which a SigComp message may be received. At step 310, in this example, the user equipment determines which of the two forms the received SigComp message takes in accordance with known processes. For reference purposes, one message may be referred to as a bytecode upload format and the other a partial state identifier format. Per FIG. 3 of the drawings of this patent application, at step 315, the question is asked which of two forms is the received SigComp message. If the form of the SigComp message is a partial state identifier message form, then, the branch is taken to step 320. At step 320, the partial state identifier message form is handled as per RFC 3320. On the other hand, if the received SigComp message is of the bytecode upload type, then, at step 325, a value of the SigComp message is reviewed by the UDVM, for example, the value of Code_len. At step 330, if the value is non-zero, then, at step 335, the non-zero value is processed in accordance with RFC 3320 for a given bytecode length and a typical bytecode upload. The bytecode is not compressed (but as will be discussed further herein, may be compressed in one embodiment). On the other hand, for example, if code_len has a value of all zeroes, then, the user equipment receiving the SigComp message follows the branch to step 340. In particular, the UE must know what a Code_len value of all zeroes means— either interpreting the value according to FIG. 2 or 2a. Now bytecode typically will not have a length of 0 or even 1 byte; consequently, other values than all zero are contemplated within the scope up to but not equal to a minimum bytecode length. Also, it is possible to utilize the other form of Sig-Comp message for a partial state identifier, the partial state identifier having a value as a signal for bytecode identifier and destination.

The destination for locally resident bytecode or bytecode package defined by a bytecode state identifier field or partial bytecode state identifier is the destination field of the Sig-Comp message in memory 131. Also, RFC 3320 provides a way of calculating a state identifier. In a similar manner, the data following the destination field value of 4 bits in FIG. 2 is followed by the bytecode state identifier which may be 20 bits in length or, using a length indicator, is identified as a byte-code partial state identifier per FIG. 2a. A bytecode state identifier generally (either partial or 20 bits in length) is then executed, for example, by user equipment as if it were a state identifier at step 345 in a manner similar to that suggested by RFC 3320, for example, by application of a known hash value and associated calculation. The locally resident bytecode or bytecode package is then calculated and placed at a destination in memory 131 according to the destination field, typically a beginning register address.

RFC 3320 defines several fields for each locally available state item, for example, a state_address. On the other hand, RFC fails to provide any indication that such an address provides an address for bytecode or a bytecode package with static dictionary (as opposed, for example, to that of a static dictionary). Thus, RFC 3320 implicitly relies on a far-end endpoint to know what to do. The inventive aspects described above with respect to FIGS. 1-3 solve this problem by explicitly telling the far-end endpoint that the state item is bytecode or a bytecode package and provides a destination for the locally available bytecode state item in memory 131 of its virtual machine 130. Moreover, the length limitation of byte-code to 4095 bytes is overcome as any length bytecode and bytecode/static dictionary package may be loaded or transmitted compressed as discussed herein.

Figure 4:
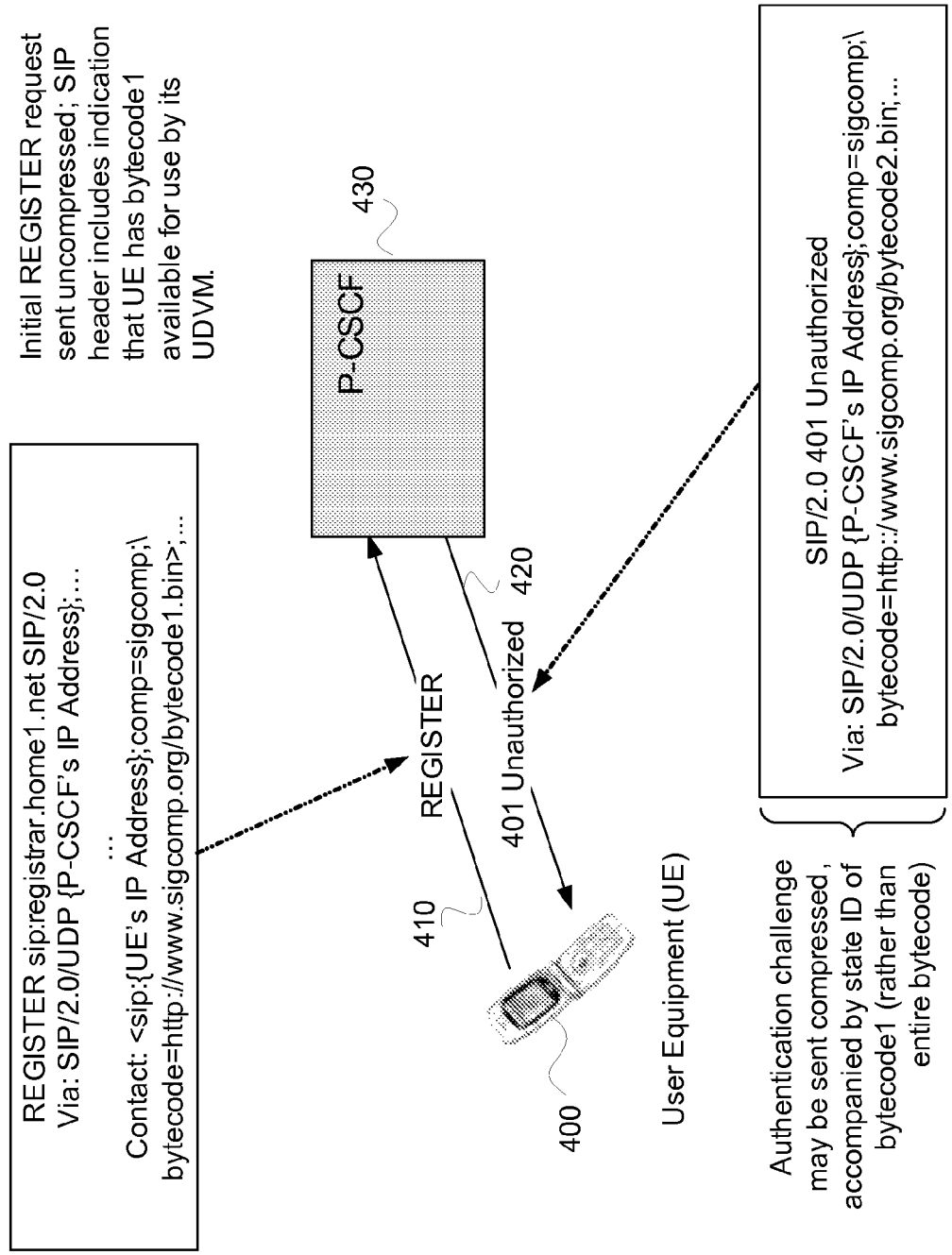
FIG. 4 provides an overview of a process whereby an endpoint may advertise the local availability of bytecode at the endpoint, in particular, the depicted example is that of user equipment (UE) advertising a first bytecode via REGISTER SIP message to a P-CSCF.

A problem, however, of the method of FIGS. 1-3 of this inventive aspect is that one endpoint may not know the locally available state items available at the other endpoint. Consequently, in accordance with an inventive aspect as represented by FIG. 4, there is provided a means at one endpoint of advertising a locally available state item such as available bytecode or a bytecode package to another endpoint. Per FIG. 4, by way of example, user equipment (UE) 400 advertises locally available bytecode1, which may comprise as defined above, a unique identifier of a given bytecode or bytecode package including an associated static dictionary by transmitting a REGISTER message 410, for example, to a P-CSCF 430. A given bytecode or bytecode package has a known, predetermined identifier value such as bytecode1, known at each endpoint. Bytecode1, for example, may represent a particular set of instructions and any associated operands in preferably compressed form and any associated static dictionary. An initial REGISTER request may be sent uncompressed. However, after an initial message from the user equipment (UE), a SIP header may include an indication that UE 400 has bytecode1 available for use by its UDVM 130 as follows: REGISTER sip: registrar.home.net SIP/2.0 Via: SIP/2.0/UDP {P-CsCf's IP address}, . . . Contact: sip:{UE's IP address}; comp=sigcomp;\bytecode=http://www.sigcomp.org/bytecode1.bin: . . . . Now, a server having the address www.sigocmp.org does not presently exist and is used by way of example of a server reachable as per FIG. 7 as a compression network platform 750. The server may be a secure or unsecure HTTP server. The exemplary message indicates that this is a SigComp related SIP message and there is a storage location at the server from which the identified package bytecode1 may be retrieved. The UE and the P-CSCF are both identified by IP address so that they both received the latest version of the identified package bytecode1. The compressor UDVM 130 in the receiving P-CSCF 430 therefore knows that it can signal, in the manner set forth in FIGS. 1-3, that bytecode1 should be loaded into UDVM memory 131 of UE 400 at a specific location indicated by destination in FIG. 2 or 2a and know what bytecode1 as an identifier stands for. The bytecode package identifier parameter, for example, bytecode1, shown here in the SIP header is one inventive aspect of the advertising REGISTER message of FIG. 4. It may be the same bytecode as is present at a SigComp or IETF server bin and thus universally available on the World Wide Web. It may comprise a compression network platform 150 as shown in FIG. 7 or related platform or server. It may be a secure https address as necessary in stead of the http address shown.

There may be a case, for example, where a given UE contains a more up-to-date bytecode than a P-CSCF. For example, a UE that is smarter than a P-CSCF roams into an area and advertises a bytecode1 value that is unknown to the P-CSCF. The P-CSCF may receive an upload from the UE and/or verify or accept an upload of bytecode1 from a compression network platform (CNP) 750 or HTTP server. Or in correspondence with a compression network platform, the P-CSCF may learn that neither the UE nor the P-CSCF have the latest version of bytecode1. For the situation of the more up-to-date, for example, roaming UE, the P-CSCF may find it more efficient to receive the bytecode1 in an upload from UE and complete a transaction with the UE. Alternatively, the P-CSCF may wish to verify the latest version with a CNP 750 or HTTP server before completing the transaction. Either embodiment is contemplated herein.

Figure 5:
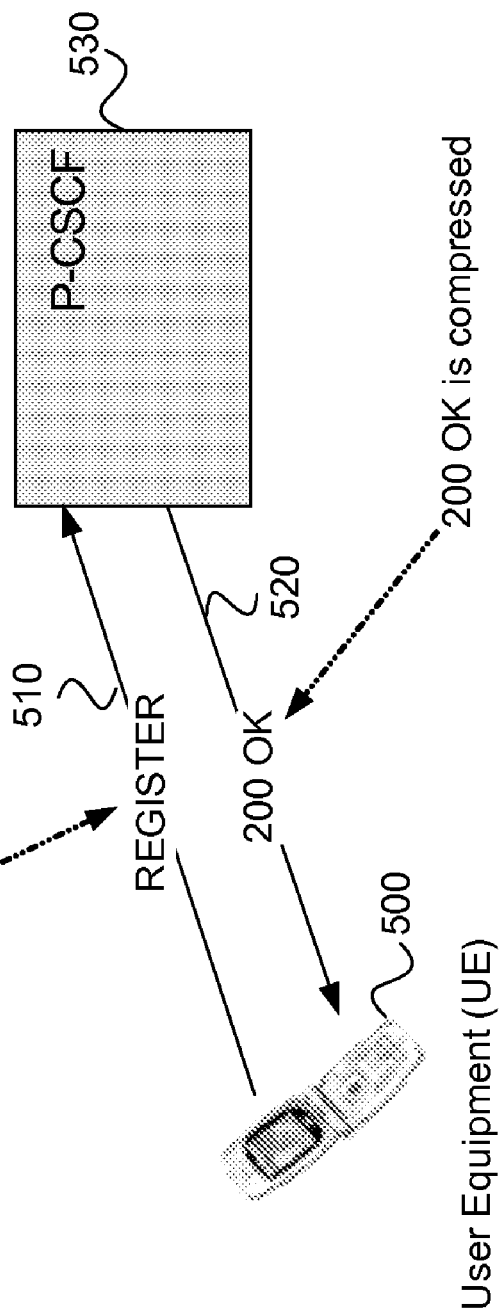
FIG. 5 provides an overview of a process whereby an endpoint may respond to an authentication challenge with a new REGISTER request, in the depicted example, user equipment UE responding to an authentication challenge by a P-CSCF.

FIG. 5 provides an overview of a process whereby an endpoint may respond to an authentication challenge with a new REGISTER request, in the depicted example, user equipment UE responding to an authentication challenge by a P-CSCF. One problem with the advertising approach of FIG. 4 is that an endpoint, such as P-CSCF 430, has no way to be assured whether the corresponding UE 400 will retain the bytecode it has been signaled to retain. Moreover, the UE 400 does not learn the name "bytecode1"—meaning, for example, the UE 400 cannot include the name "bytecode1" in bytecode parameters in future SigComp messaging flows. Consequently, in this scenario, an authentication challenge is issued by P-CSCF 530 indicating that bytecode2-compatible compression algorithm, a second identified bytecode or bytecode package, is available for use by its UDVM 130. If the UE 500 has a compression algorithm that is compatible with bytecode2, it can signal (advertise) that it wants that bytecode or bytecode package to be loaded into P-CSCF UDVM 130 memory 131, for example, using the SigComp message format of the inventive aspect of one of FIG. 2 or 2a or variants thereof suggested herein. Then, when the UE 500 sends a second register request 510 in response to the authentication challenge of the P-CSCF 530, as shown in FIG. 5, that request can be sent compressed. At step 520, the P-CSCF 530 replies 200 OK to the UE responding to the authentication challenge with new REGISTER request 510 containing its credentials. As per FIG. 5, this request 510 may be sent compressed with a bytecode2 compatible compression algorithm.

The method and apparatus of FIGS. 1-5 show how Sig-Comp endpoints can advertise state items, for example, bytecodes or bytecode packages that they have locally available as locally available state items, thereby providing an alternative to uploading bytecode each time a bytecode is needed as per RFC 3320 FIG. 3, bytecode uploading message format. With the inventive aspects of FIGS. 1-5, any guesswork is avoided possibly leading to decompression failures when one endpoint incorrectly assumes the other endpoint already has required decompression bytecode. The guessing endpoint may send a Sigcomp message in accordance with FIG. 2, 2a and alternative embodiments thereof, issue an authentication challenge or advertise its capabilities. The other endpoint may advertise its capabilities and enter into a dialog to resolve decompression questions or turn to a CNP 750 for support.

On the other hand, the method and apparatus of FIGS. 1-5 leave remaining open questions: 1) how can one endpoint per FIG. 1 obtain/request a bytecode that it does not have locally available to it? 2) How does this endpoint signal its missing bytecode in future signaling flows (for example, SIP registration flows like the one shown in FIG. 4.? 3) Can any of the above inventive aspects of FIGS. 1-5 be applicable to other state items, such as static dictionaries? There follows a discussion of methodology whereby a SigComp endpoint per FIG. 1 may obtain new or updated locally-available state information—in particular, by way of example, bytecode and associated static dictionaries, i.e. bytecode packages. Whenever, for example, a P-CSCF needs to obtain updated state items such as the latest version of a compression or decompression algorithm, the latest version may be provided via broadcast, for example to P-CSCF's from an administrative source such as a compression network platform, a SigComp secure or insecure server, IANA or other source.

State-information updates for user equipment (UE) generally is more difficult because, for example, of the great quantity of user equipment. User equipment greatly outnumbers the number of P-CSCF's, for example, and a broadcast update would conceivably create a traffic load issue on a given network. Moreover, there is no way to know in advance when to schedule such a broadcast because, while the on/off state of given UE may be predicted to some extent, certainly, there is no best single time of day to schedule an update. The following discussion centers on dynamic methods in which user equipment (UE) may obtain updated state information.

In many cases, compression algorithms (and related decompression algorithms) are tied to one or more specific static dictionaries. Knowing only bytecode at a given endpoint per FIG. 1 may not be sufficient to effectuate a given compression/decompression unless the endpoint also knows the identity and location of an associated static dictionary. For example, an instruction to load bytecode or a bytecode package per FIG. 2, 2a and their alternative embodiments may succeed only to be followed by a decompression failure because the locally available bytecode does not have an associated static dictionary or it has not been associated with the bytecode, i.e. it is, for compression/decompression purposes, locally unavailable (even if it is physically available).

An approach to solving this problem is to package a bytecode with one or more required static dictionaries. In one embodiment, the necessary static dictionary is hard-coded with its bytecode so that a bytecode state identifier per FIG. 2 or bytecode partial state identifier per FIG. 2a identifies both the bytecode and any associated static dictionary or one or the other or both as discussed above in connection with FIG. 2a. On the other hand, hard-coding bytecode and static dictionary together appears to be less flexible than another alternative because, for example, a new, more efficient bytecode may use the same static dictionary as a prior, less efficient version and the reactuation of the same static dictionary for the new more efficient bytecode would appear to be an inefficient use of existing resources. As described above in the discussion of the embodiment of FIG. 2a, a length indicator as defined may define more than length and include identifiers of a state item, be it a static dictionary, bytecode, bytecode package or alternative state item.

According to another inventive aspect, a SigComp state package is defined that comprises a UDVM bytecode and, optionally, one or more associated static dictionaries used by that bytecode. In other words, bytecode1 or bytecode2 introduced in the discussion earlier regarding FIGS. 4 and 5 may be defined as a collection of bytecode instructions, their operands and any required static dictionaries. The inclusion of a static dictionary into the SigComp state package definition is optional because there exists bytecode requiring no static dictionary for compression/decompression. Alternatively, a static dictionary may have alternative uses than for one given bytecode.

Referring now to FIG. 6, there is shown an overview of a process or generalized method whereby an endpoint may obtain new or updated state items including bytecode and associated static dictionaries as a SigComp state package. In dotted and dashed line form and shown in FIG. 6, for example, a P-CSCF 630 may transmit a SIP INFO message at step 610 that names a SigComp state package, by way of example, sigcomp_state pgk 5 and identifies its contents. The user equipment (UE) acknowledges the request step 610 with a SIP 200 OK at step 620. For example, the package 5 consists of bytecode3 at a given HTTP server 660 such as the fictitious server www.sigcomp.org/bytecode3.bin and an associated static dictionary located at the fictitious server www.lexicon.org/oma_pres_dict_v2.bin. This fictitious location for dictionary retrieval may imply a lexicon.org server that does not exist but is a separate location for locating a current, for example, version 2 of a static dictionary such as an oma presence dictionary. Together, bytecode3 represents both the bytecode available from one source and an associated dictionary available at another source. By defining the URL's, the message of step 3, 640 may comprise an HTTP Get. In other words, pointers may be provided to an HTTP server where the components of the SigComp state package (for example, bytecode and dictionary) may be obtained. RFC 4483 entitled "A Method for Content Indirection in SIP Messages," May 2006, E. Burger, and available via the IETF provides guidance on how the pointers may be formatted within the SIP INFO message and is incorporated by reference as to any material deemed essential to an understanding of the SIP INFO message step 610 and message of FIG. 6. A HTTP 200 OK follows at step 4, 650. If UE 600 already, for example, has the appropriate dictionary, the bytecode may be returned with the message body HTTP 200 OK or vice versa, the UE may receive the dictionary if it has the bytecode.

In a variation on the above-described inventive aspect, the P-CSCF may send a SIP info message at step 610 which, as before contains the name of the package and lists the contents. The pointers, however, are differently comprised. The pointers of the alternative embodiment identify a SIP URL for a message session relay protocol (MSRP) session by sending a SIP INVITE message to the MSRP server (not shown) reachable by the SIP message. See, for example, "The Message Session Relay Protocol", draft-ietf-simple-message-sessions-19, dated Feb. 23, 2007, for further information about the construction of MSRP incorporated by reference as to any subject matter believed essential to an understanding of this embodiment and the subsequent discussion of FIG. 11 for an MSRP session.

Further details of such a session and populating a SIP INVITE message may be found at the IETF at sraft-ietf-mmusic-file-transfer-mech.oo.txt entitled "A Session Description Protocol (SDP) Offer-Answer Mechanism to enable File Transfer," Garcia-Martin et al., Dec. 18, 2006, both IETF publications available on the world wide web and incorporated by reference herein as to any subject matter deemed essential to an understanding of how to populate such a message.

Referring to FIG. 7, a universal compression network platform (CNP) 750 is provided as a wireless network resource for compression and decompression which any UDVM 130, per FIG. 1 or other virtual machine may use as a resource for assuring that a given static dictionary or compression or decompression algorithm or state item generally are current according to a version number and identified by a unique identifier. In its database may be maintained the latest version of bytecode, a compression and associated decompression algorithm and/or static dictionary or other compression/decompression tool including a hash value for universal access in a manner similar to the manner in which regional databases and servers has been provided for number portability in the United States. Alternatively, a compression network platform (CNP) may be implemented on a wireless communications network by network basis, for example, by each public land mobile network (PLMN) internationally. As will be further described herein, a compression network platform may be restricted to a given type of compression/decompression process and further located as close to user equipment as possible to reduce latency in UE to server transmission.

In FIG. 7, a maximum of four different wireless networks, 710, 720, 730 and 740, are shown which may be interconnected by the public switched telephone network (PSTN) (not shown to keep the figure as simple as possible). There may be a telephone, for example, User A equipment, mobile device 715, that, for example, wants to advertise state items to call session control functions, publish or subscribe to presence information or create or edit buddy lists by communicating with server(s) residing, for example, in A's home network 720 or other networks. Alternatively, user equipment (UE) device 715 may wish to share content, (e.g., a photograph or live video stream, digitized music, computer software, share a buddy list, contact information or other application) with another mobile device 725 in a different visited network 740. The information or content being transmitted or advertised may contain, for example, bytecode, bytecode package, state identifier, static dictionaries, hashes or other packages by identifier, text, or the signaling exchanges that are conducted in order to facilitate transmission or availability of content.

User equipment or mobile device as used herein refers to any known mobile terminal which may comprise terminals limited to voice telephony but is not to be considered so limited as user equipment may include personal computers, personal communications devices and other devices having, for example, multimedia and computational capability. The first number of a reference character in FIGS. 1-11 designates the figure number.

Preferably, the data signals, for example, bytecode—instructions and operands, state items, static dictionary, text or other content, to be transmitted are to be compressed for transmission through the wireless medium. Both mobile devices 715 and 725 are assumed to be visiting different wireless networks. Mobile device A 715 is visiting network 710 and mobile device B 725 is visiting network 740. Visited network 710 by mobile device 715 has proxy CSCF 735-1 and general packet radio service GPRS 765-1. Mobile 715's home network 720 has interrogating CSCF 745-1, serving CSCF 755-1 and optional interrogating CSCF 745-2. Ideally, each wireless network 710, 720, 730, 740 may agree to exchange and maintain their CNP databases by mutual agreement with the latest revisions and techniques in accordance with one embodiment. CNP 750 may be shared by all networks. But, in another embodiment, there may be a plurality of these CNP platforms, servers and databases, and they may be redundant within each public land mobile network (PLMN). Such CNP's 750 are preferably provided with redundancy and in different regions of a country for purposes, for example, of disaster recovery. Not shown in FIG. 7 are other locations of UDVM's 130 per FIG. 1 or other types of endpoints that may utilize the services of a CNP 750 such as a SIP server, an MSRP server, a video-on-demand application server, a music server, a presence server and the like. Again, FIG. 7 would be greatly complicated if each such point of possible signal compression/decompression in or outside a wireless network were attempted to be drawn within the boundary of the figure.

Mobile device 715 in accordance with an aspect of the invention may advertise and/or share its bytecode, compression algorithm, static dictionary or other compression technique by a unique identifier with a network platform or with another mobile device 725 with which it wishes to communicate. In the event that the far end (i.e. network platform or mobile device 725) does not understand the unique identifier, such as bytecode1, it may request the mobile device 715 to transmit the algorithm or static dictionary used (along with its identifier) or receive the compression method and identifier from a UDVM at P-CSCF 735-2 by identifier look-up. P-CSCF 735-1 may also be a check point to be sure there is consistency among points of compression and/or decompression. Also, in accordance with an aspect of the invention, when all else fails, a CNP 750 may be referred to by a virtual machine of mobile device 715 and within mobile device 725 for an appropriate compression/decompression tool that is application dependent. P-CSCF 735-1, 735-2 or CNP 750 may transmit identifiers or algorithms and identifiers to mobile devices 715, 725 for storage therein depending on the needs.

In accordance with another embodiment which also may be described with reference to FIG. 7, rather than uploading/downloading bytecodes to a virtual machine, for example, in accordance with RFC 3320, a UDVM associated with a mobile device or a P-CSCF 735-1, 735-2, a compression application of the bytecode may be applied, for example, to compress the bytecode for uploading/downloading rather than the current method of transmitting the bytecode itself to a far end virtual machine. According to one aspect of this embodiment, the compression technique may comprise a hash of the bytecode, for example, in a manner similar to that described as a static dictionary in RFC 3485 for SIP and SDP or signal compression generally as described by RFC 3320 and 3321.

According to another aspect which may be described with reference to FIG. 7, there may be a publicly-available registry for storing the bytecode, algorithm, hash or static dictionary for the bytecode, for example, as a universal resource name as would be stored in the Internet assigned numbers authority (IANA) database registry 760. According to the first embodiment, the algorithm, hash or static dictionary for bytecode may be stored along with its current version number and unique identifier (such as bytecode1) in a CNP 750 described above for universal access by any virtual machine 130.

In accordance with yet another embodiment, consider hypertext transfer protocol (HTTP) having a header and a message payload. In this embodiment, a static dictionary may be provided for compression of the HTTP payload or message portion. In particular, this embodiment of a compression method recognizes common phrases used in the message portion such as tags from application-specific XML schema. Tags may be used, for example, to delimit name, email address, telephone number, facsimile number and so on. In order to provide a positive user experience, it may be expedient to allow each subscriber to have a large number of contacts and to organize their contacts into multiple buddy lists. The tags that delimit the data can easily become voluminous. Consequently, an application of this embodiment is presence/group list management in a wireless network. As defined above, presence comprises online/offline status, preferred means of communicating (such as text message or voice) and other data about the user of a mobile device such as location of the mobile device. Known compression algorithms for HTTP such as DEFLATE and GZIP may be augmented in this embodiment to provide a static dictionary for such common phrases which may be stored at the compression and decompression virtual machine and accessed as above from a CNP 750 or via IANA 760 or other registry. In particular, address data for a look-up table of the static dictionary may be transmitted in place of the common phrase. On decompression at the receiving end, the address data indexes the look-up table of the static dictionary and retrieves the common phrase. Consequently, the user of a mobile device may enter a contact list or update a contact list for, for example, short message services. The virtual machine contained within the mobile device or its server may have access to and permanently store a known compression algorithm for delimiting tags and other data along with its added feature of accessing a static dictionary for translating other common phrases into transmittable address data for indexing a look-up table that may be used at the decompression end for decompression.

Figure 8:
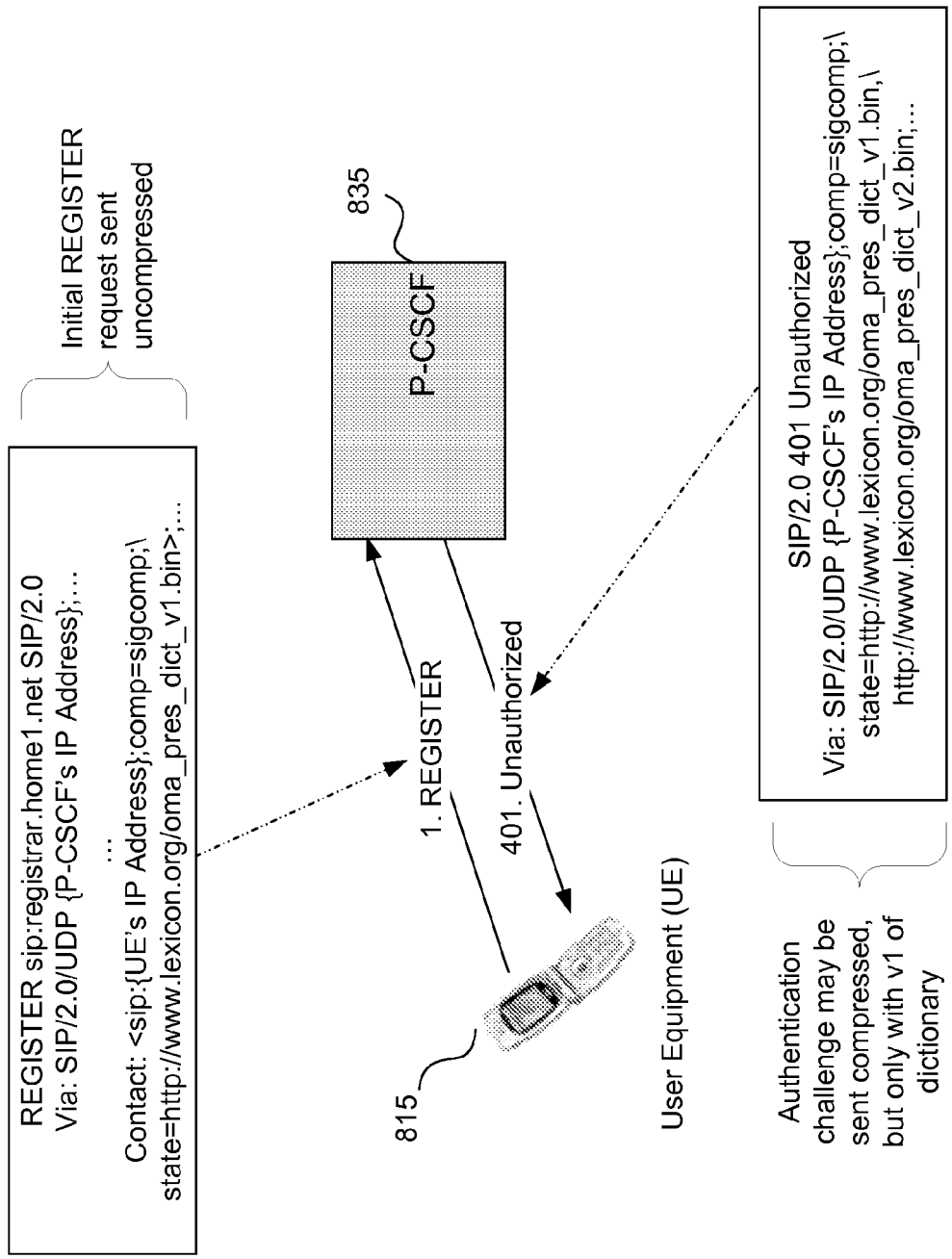
FIG. 8 is a schematic representation of a message transfer for registration between user equipment UE and a P-CSCF of FIG. 7 as one example for message compression.
Figure 9:
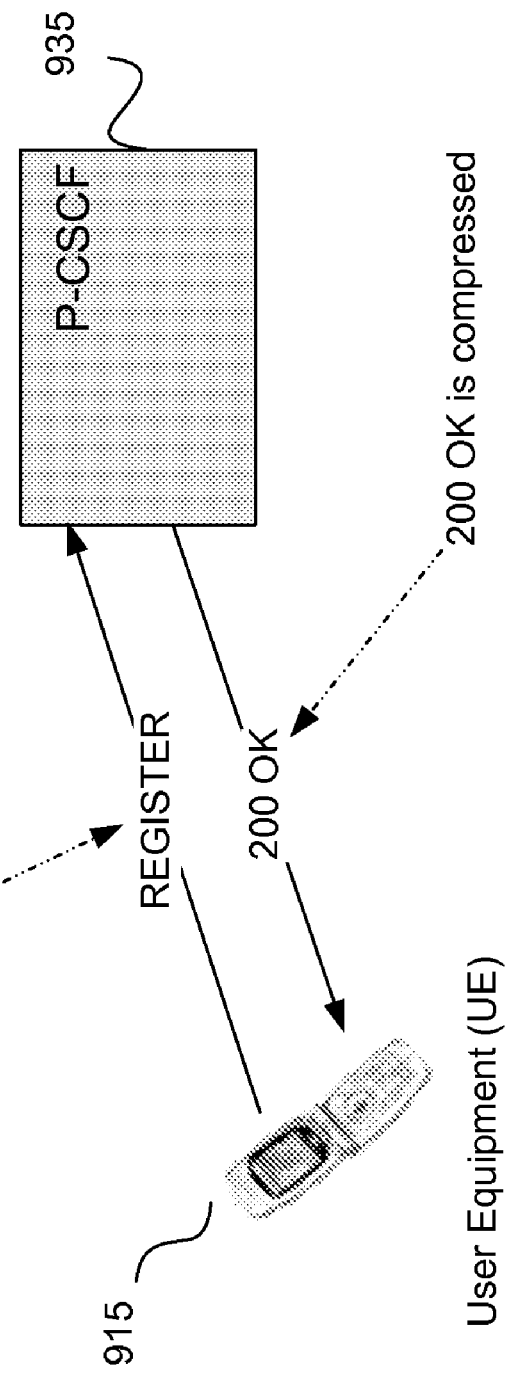
FIG. 9 is a second schematic representation of a message transfer for registration between user equipment UE and a P-CSCF of FIG. 7 as a second example for message compression.

Taken together, FIGS. 8 and 9 are schematic representations of a message transfer for registration between user equipment UE and a P-CSCF of FIG. 7 as an example for message compression. Referring first to FIG. 8, there is shown an example of an application of message compression during registration of a cellular phone or, more generalized, user equipment (UE). In this embodiment, the user equipment 815 and P-CSCF 835 exchange information about the compression/decompression dictionaries which each endpoint may use for compression/decompression during a registration process. A first step may be the user equipment 815 sending a REGISTER request to the P-CSCF 835 providing its authentication credentials. According to one embodiment of the present invention, the REGISTER request includes a "state" parameter for defining a version of an Open Mobile Alliance (OMA) presence dictionary. Such a dictionary for OMA presence is under consideration by the Alliance but has not yet been published. Nevertheless, a value for such a dictionary is depicted as a suggested value for such a dictionary including a version number v1. The signal flow of FIG. 8 assumes that the initial REGISTER request is sent uncompressed giving the P-CSCF 835 an opportunity to ascertain which dictionaries the P-CSCF supports. The REGISTER request may be compressed using version 1 of the OMA presence dictionary in an alternative embodiment. For example, before registering with an IMS core, user equipment must locate a P-CSCF. In third generation 3GPP networks, one of the P-CSCF discovery procedures utilizes Protocol Configuration Options which may incorporate "comp" and "state" parameters. Doing so may enable the user equipment to compress an initial REGISTER request.

The P-CSCF 835 forwards the REGISTER request within an IMS core, not shown, which may issue an authentication challenge. As shown, a P-CSCF 835 then forwards the authentication challenge to the user equipment 815 as the 401 Unauthorized message in FIG. 8. The P-CSCF 835 inserts the comp and state headers (parameters) and their values as shown. In accordance with one embodiment, the "state=" is followed by the definition of an OMA presence dictionary, which may be a static dictionary. The "state=" from user equipment 815 alerts P-CSCF 835 of the dictionary in which "comp=sigcomp," among other message components, may be found. IETF 3486 teaches obtaining a "comp" uniform resource identifier string from the outbound proxy before the user equipment establishes a session. The depicted signal flow accomplishes that objective during registration. In the reply message from P-CSCF 835, a similar "state=" is followed by a dictionary definition as will be further explained below. In SIP headers, a string "comp=sigcomp" is frequently used, for example, as a Uniform Resource Identifier parameter in an initial REGISTER request and in a Via header field in the authentication challenge of FIG. 8. This "comp" string, by way of example, may be replaced by a compressed string of characters representing the string in an alternative or subsequent message. In a message 1. REGISTER from the user equipment 815 to the P-CSCF 835, as well as in the message 401. Unauthorized, the same comp string is found. Consequently, static dictionaries at either user equipment 815 or a P-CSCF 835 may be provided to reconstruct a compressed string into the transmitted string "comp=sigcomp." In FIG. 8, in the authentication challenge message, there are shown two "state=" strings indicating that the P-CSCF supports both versions 1 and 2 of, for example, an OMA presence dictionary.

After a handset (user equipment) successfully attaches to a wireless network (not shown to keep FIG. 8 simplified), the handset of UE 815 attempts to register with the IMS (not shown) by sending a SIP register message 1. REGISTER, for example, in accordance with IETF RFC 3486. In reply, there may be the depicted 401.UNAUTHORIZED authentication challenge message. This 401 message is an authentication challenge—that is, a request to the handset of UE 815 to provide its authentication credentials. Thereafter, another 1. REGISTER request containing authorization credentials would follow that may contain compressed data of a static dictionary alternatively to a given string such as "comp=sigcomp." That is, a first message may be sent uncompressed as shown in FIG. 8, but subsequent messages would follow with compressed data replacing the compressed string in accordance with a mutually agreed to static dictionary and version defined, for example, by "state=". Clearly, once a static dictionary is defined at each end of the transmission path, thereafter, the defined static dictionary may be used for all such follow-up messages.

In the 401.Unauthorized challenge message, the receiver, the P-CSCF 835, tells the user equipment UE 815 what dictionaries it has on hand in its "state=" parameter definition. In FIG. 8, the parameter is shown in a "Via:" header portion of the forward message to P-CSCF 835 and the return 401.Unauthorized message to signal the user equipment 815. The "state=" parameter definition considers that the version of the dictionary is v1 at the user equipment 815 and, further, that a v2 may be identified in the 401.Unauthorized reply as available at the P-CSCF 835. Unless the user equipment 815 verifies that it possesses version 2, the P-CSCF 835 may be limited to version 1 in its communication with the user equipment 815. As discussed above, a compression network platform 750 or alternative source (per FIG. 7) may be resorted to for obtaining a version 2 of a defined static dictionary via an alternative communication path not shown in FIG. 8. Obtaining compression/decompression algorithms and dictionaries will be further described with reference to FIGS. 10 and 11.

FIG. 9 is a second schematic representation of a message transfer for registration between user equipment UE 915 and a P-CSCF 935 of FIG. 7 as a second example for message compression. In FIG. 9, the user equipment 915 provides its authentication credentials in a new REGISTER request in response to the authentication challenge. This request can be compressed based on a version 1 of an OMA presence dictionary. The P-CSCF 935 replies on the assumption that "comp=sigcomp" has already been initialized. Moreover, 200 OK in reply saying to the user equipment 915 that it is authenticated may be compressed as well. Later messages between network elements shown or suggested are compressed in both directions, for example, when user equipment 915 may send an INVITE message to initiate a session (not shown).

In FIGS. 8 and 9, it is assumed that all messages are SIP messages according to present standards. Alternative embodiments of SIP and alternative forms of session protocols are contemplated within the scope of the invention. Moreover, while the depicted environment is IMS, the embodiment may be implemented within a non-IMS environment. A backslash character in a text box of either FIG. 8 or 9 should be interpreted as a line continuation character.

In principle, user equipment 815, 915 in FIGS. 8 and 9 may obtain version 2 of an OMA presence dictionary from an alternative location such as a compression network platform or P-CSCF of FIG. 7 and then compress a second REGISTER request according to the updated version. At present, updating the user equipment dictionary version in user equipment 815, 915 may not be as practical as may be possible in the future due to the latency involved in awaiting the transmission of a version 2 or, perhaps preferably, version one/version two changes from an alternate site to the user equipment. The embodiment of FIGS. 7 and 8 is applicable regardless of whether dynamic (as opposed to static) compression is also used or regardless of whether SIP runs via Transport Layer Security (TLS) or not. If TLS is utilized, sip URI's may be replaced with sips URI's in the figures (where "sips" stands for "secure SIP").

Figure 10:
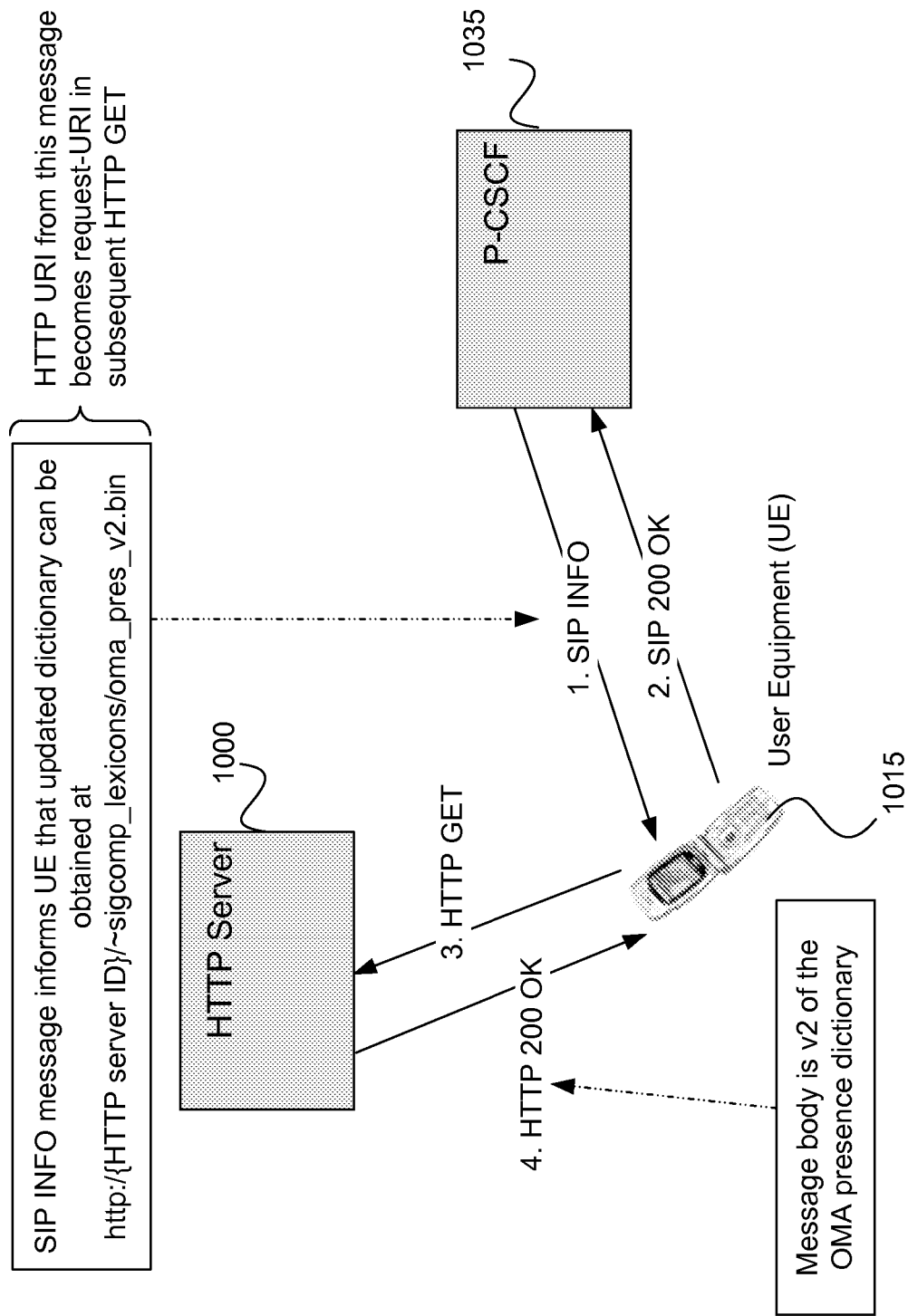
FIG. 10 is a schematic representation of a first message transfer among an HTTP server, user equipment UE and a P-CSCF of FIG. 7 by which the user equipment may obtain an updated dictionary from an HTTP sever or other compression network platform of FIG. 7.

FIG. 10 is a schematic representation of a first message transfer among an HTTP server 1000, user equipment UE 1015 and a P-CSCF 1035 of FIG. 7 by which the user equipment 1015 may obtain an updated dictionary from an HTTP server 1000 or other compression network platform 750 of FIG. 7. In FIG. 10, whenever a P-CSCF 1035 needs to obtain an updated dictionary, the signal flow may be coordinated by an automated administrative process (not shown). Dictionary updates on user equipment 1015 may be handled differently than P-CSCF updates—an administrative process need not be required. As indicated above, user equipment (UE) 1015 is so numerous in comparison to a network platform such as a P-CSCF 1035 that there may be only a limited means of knowing ahead of time when a given user equipment will be powered up and make a REGISTER request. FIG. 10 and FIG. 11 show two dynamic methods by which a given user equipment 1015, 1115 may obtain an updated dictionary.

In FIG. 10, the messages between depicted elements are numbered to indicate a sequence of message signals. Besides numbering, the message signals are labeled to indicate which are SIP messages and which are HTTP messages. In signal 1, the P-CSCF 1035 may send a SIP INFO message to the user equipment 1015 indicating a preferred HTTP server 1000 for updating a dictionary to be updated. As alluded to above and to reduce latency, the HTTP server 1000 may be selected to be not busy and as close as possible to the user equipment 1015. As highlighted in the text box, the SIP INFO message informs the UE 1015 that an updated dictionary can be obtained, by way of example, at http://{HTTP server ID}/sigcomp_lexicons/oma_pres_v2.bin. The {HTTP server ID} in the URI may be an IP address or domain name that user equipment 1015 has resolved to an IP address or using any known method of identifying an HTTP server. The HTTP server 1000 to which the URI refers may or may not be in the same service provider's network as the P-CSCF 1035. Even though a universal, unique name may be allocated to a dictionary version, a given service provider may prefer that the dictionary be downloaded from a platform in its own network. In addition, the service provider may control latency better if located within its network than in the public internet. The HTTP URI from this message becomes a request URI in a subsequent HTTP GET message step 3 discussed below. Next, P-CSCF 1035 transmits a SIP 200 OK message to the user equipment which results in the HTTP GET request of the HTTP server 1000, step/signal/message 3. The identified HTTP server 1000 responds in sequence with message 4. HTTP 200 OK whereby the message body of a second version of the OMA presence dictionary is transmitted to the user equipment 1015 or at least the changes between version 1 and version 2.

Figure 11:
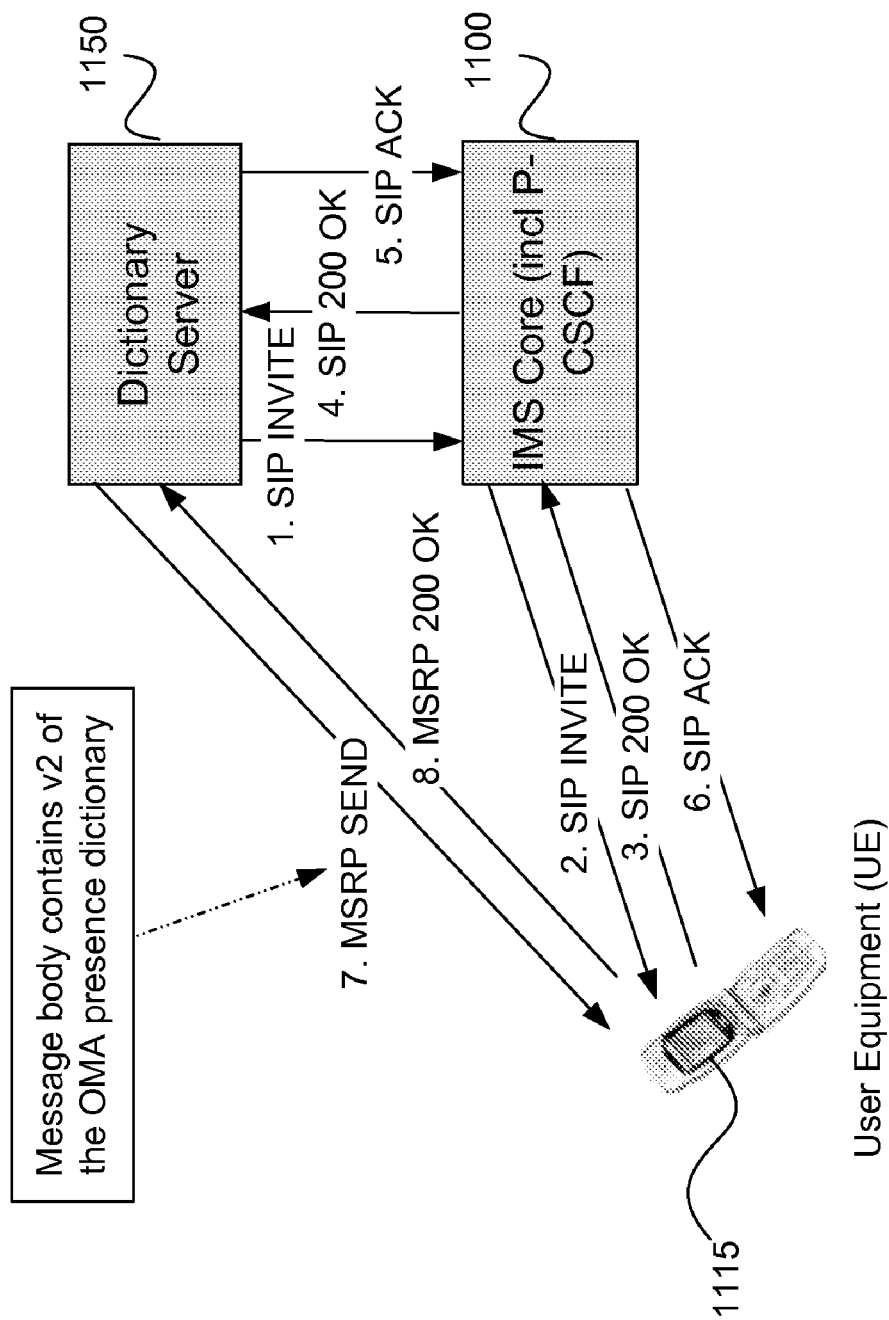
FIG. 11 is a schematic representation of a second message transfer among a dictionary server, user equipment UE and an IMS Core (including a P-CSCF of FIG. 7) by which the user equipment may obtain an updated dictionary from a dictionary sever or other compression network platform of FIG. 7.

FIG. 11 is a schematic representation of a second message transfer among a dictionary server 1150, user equipment UE 1115 and an IMS Core 1100 (including a P-CSCF of FIG. 7) by which the user equipment may obtain an updated dictionary from a dictionary server 1150 or other compression network platform 750 of FIG. 7. Eight message signals are shown in sequence for accessing a dictionary server 1150 in FIG. 11. As opposed to FIG. 10 where a P-CSCF 1035 sends a message to user equipment 1015 telling it where to find an updated dictionary, in FIG. 11, an application server may push the dictionary to the user equipment 1115 from the dictionary server 1150. The dictionary server 1150 initiates an MSRP (Message Session Relay Protocol) session with the user equipment 1115 via the IMS core 1100. Messages 1-6 constitute a known or standard SIP session set-up comprising an INVITE via the IMS Core 1100 to the user equipment 1115 (steps 1 and 2), a 200 OK return (steps 3 and 4) and a SIP ACK (acknowledgement) (steps 5 and 6). Once the session is set-up, the dictionary server 1150 exchanges, for example, the dictionary version two (or the changes between versions) for an MSRP 200 OK message. The message body of MSRP SEND, step 7, contains v2 of the OMA presence dictionary. As before, if the user equipment 1115 already has a version 1, then, only the changes between version 1 and version 2 need be transmitted. The purpose of the MSRP session having been accomplished, the session may be torn down in known manner via a SIP BYE/200 OK exchange between the dictionary server 1150 and the user equipment 1115.

Note that according to both FIGS. 10 and 11, the supporting network is the instigator for the user equipment obtaining a new version of a dictionary. For example, if the serving network is IMS, an IMS service provider may want to control the timing of the dictionary download, for example, to reduce latency, for example, avoid a busy hour, avoid performing a download in a roaming scenario and so on. The depicted dictionary server could be alerted by the network in a number of ways. For example, the P-CSCF 1035 may alert the server; the IMS core 1100 could be configured to forward copies of registration request transactions to a dictionary server for review.

Continuing the discussion of FIGS. 10 and 11, the user equipment 1015, 1115 now has obtained an updated user dictionary (which may be a static dictionary or a dynamic compression/decompression algorithm). Consequently, the user equipment 1015, 1115 will indicate the change in status the next time it dispatches a REGISTER or other request to the IMS core. At that time, SigComp would be initialized according to the updated version.

Thus there has been shown and described several approaches for the optimized application of bytecodes and bytecode packages which may include static dictionaries and the application of static dictionaries in HTTP applications. The packages may be identified by an identifier and be utilized separately or in concert with dynamic compression/decompression algorithms in a wireless network to considerable advantage for different purposes, in particular, bytecode and static dictionary actuation, load/upload and maintenance applications. The following set of claims should not be deemed to be limited to the embodiments described above. Alternative embodiments may come to mind to one of ordinary skill in the art for application in alternative or later generation wireless networks.

What is claimed is:

1. A method of actuating locally available state items in a virtual machine of an endpoint of a wireless network comprising:

receiving at a receiving virtual machine a destination address and one of a bytecode or a bytecode package state identifier in a SigComp message, the SigComp message having a first format and a first field of the SigComp message having a predetermined value, and actuating a locally available state item at the destination address in response to the bytecode or bytecode package state identifier; and wherein the first field is a code_len field and the predetermined value is a value of less than a minimum bytecode length.

2. A method as recited in claim 1 wherein the first field comprises a code_len field and the predetermined value is a value of zero.

3. A method as recited in claim 1 wherein the bytecode or bytecode package state identifier comprises 20 bits.

4. A method as recited in claim 1 wherein a bytecode package associated with the destination address and one of a bytecode or a bytecode package state identifier comprises bytecode and an associated static dictionary.

5. A method as recited in claim 4 wherein an identified bytecode is available to a call session control function at a first network server and an associated static dictionary is available at a second network server.

6. A method as recited in claim 4 wherein an identified bytecode and an associated static dictionary are available to a call session control function endpoint as an identified package at a network server.

7. A method as recited in claim 1 wherein the receiving virtual machine comprises an element of a user equipment endpoint, said endpoint advertising a locally available state item.

8. A method as recited in claim 1, wherein the receiving virtual machine is responsive to an authentication challenge from another endpoint.

9. A method as recited in claim 1, wherein a bytecode is available to a call session control function endpoint at a network server.

10. A method of actuating locally available state items in a virtual machine of an endpoint of a wireless network comprising:

receiving at a receiving virtual machine a destination address and a length indicator for a bytecode partial state identifier in a SigComp message, the SigComp message having a first format and a first field of the SigComp message having a predetermined value, and actuating a locally available state item at the destination address in response to the bytecode partial state identifier and the length indicator; and wherein the first field is a code_len field and the predetermined value is a value of less than a minimum bytecode length.

11. A method as recited in claim 10 wherein the first field comprises a code_len field and the predetermined value is zero.

12. A method as recited in claim 10 wherein the length indicator comprises 2 bits.

13. A method as recited in claim 12 wherein the 2 bit length indicator indicates a selection among a six, nine and twelve bit length of a bytecode partial state identifier.

14. An endpoint in a wireless network comprising: a memory having locally available state items including bytecode, a receiving virtual machine responsive to a SigComp message received by the receiving virtual machine, the SigComp message having a first format, and a first field of the SigComp message having a predetermined value, and responsive to one of a bytecode or bytecode package state identifier and a destination address received in the SigComp message to actuate the locally available state item at the destination in response to the bytecode or bytecode package state identifier; and wherein the first field is a code_len field and the predetermined value is a value of less than a minimum bytecode length.

15. An endpoint as recited in claim 14, wherein the receiving virtual machine is responsive to an authentication challenge received from another endpoint.

16. An endpoint as recited in claim 14, wherein the endpoint is responsive to advertise the local availability of a state item.

17. An endpoint as recited in claim 14, wherein the endpoint is responsive to communicate with a network server for receiving an identified bytecode or bytecode package from at least one server.

18. An endpoint as recited in claim 14, wherein the first field comprises a code_len field and the predetermined value is a value of zero.

* * * * *